US009595202B2

(12) United States Patent
Chong et al.

(10) Patent No.: US 9,595,202 B2
(45) Date of Patent: Mar. 14, 2017

(54) PROGRAMMING LEARNING CENTER

(71) Applicant: Neuron Fuel, Inc., Mountain View, CA (US)

(72) Inventors: Kelvin Voon-Kit Chong, Mountain View, CA (US); Srinivas A. Mandyam, Los Altos, CA (US); Krishna Vedati, Los Altos, CA (US)

(73) Assignee: NEURON FUEL, INC., Mountain View, CA (US)

( * ) Notice: Subject to any disclaimer, the term of this patent is extended or adjusted under 35 U.S.C. 154(b) by 120 days.

(21) Appl. No.: 13/715,417

(22) Filed: Dec. 14, 2012

(65) Prior Publication Data

US 2014/0170633 A1    Jun. 19, 2014

(51) Int. Cl.
G09B 7/12       (2006.01)
G09B 5/06       (2006.01)
G09B 5/12       (2006.01)
G09B 7/02       (2006.01)

(52) U.S. Cl.
CPC .............. *G09B 5/062* (2013.01); *G09B 5/12* (2013.01); *G09B 7/02* (2013.01)

(58) Field of Classification Search
CPC ...... G09B 7/02; G09B 5/062; G09B 19/0053; G06F 8/34
USPC .................................................. 434/118, 379
See application file for complete search history.

(56) References Cited

U.S. PATENT DOCUMENTS

| | | | |
|---|---|---|---|
| 5,517,663 A * | 5/1996 | Kahn | G06F 3/0481 345/473 |
| 5,535,422 A | 7/1996 | Chiang et al. | |
| 5,745,738 A | 4/1998 | Ricard | |
| 5,787,422 A | 7/1998 | Tukey et al. | |
| 6,149,441 A | 11/2000 | Pellegrino et al. | |
| 6,201,948 B1 | 3/2001 | Cook et al. | |
| 6,468,085 B1 * | 10/2002 | Bergan | G09B 5/04 434/236 |
| 6,493,869 B1 * | 12/2002 | Kwiatkowski | G06F 8/30 717/106 |
| 6,690,914 B2 | 2/2004 | Ramachandran et al. | |
| 6,865,368 B2 | 3/2005 | Hoyashita et al. | |
| 7,077,806 B2 | 7/2006 | Ackermann et al. | |

(Continued)

OTHER PUBLICATIONS

Maloney, J., Resnick, M., Rusk, N., Silverman, B., Eastmond, E. (2010). The Scratch Programming Language and Environment. ACM Transactions on Computing Education, Nov. 2010. <http://scratch.mit.edu/info/research/>.*

(Continued)

*Primary Examiner* — Sam Yao
*Assistant Examiner* — Michael Humphrey
(74) *Attorney, Agent, or Firm* — Greenberg Traurig, LLP

(57) ABSTRACT

A programming learning center includes a learning center workshop and a learning module generator. The learning center workshop allows a user to create a computing program by connecting programming blocks portrayed visually within the learning center workshop as building blocks. The learning module generator generates a learning module from the computing program. The learning module iterates through the computing program to generate a sequential list of steps. The learning module generator allows the user to add notations to the sequential list of steps and to reorder steps in the sequential list of steps.

9 Claims, 19 Drawing Sheets

(56) References Cited

U.S. PATENT DOCUMENTS

| | | | |
|---|---|---|---|
| 7,134,090 B2* | 11/2006 | Kodosky | G05B 19/0426 715/748 |
| 7,152,229 B2 | 12/2006 | Chong et al. | |
| 7,174,534 B2 | 2/2007 | Chong et al. | |
| 7,370,315 B1 | 5/2008 | Lovell et al. | |
| 7,644,262 B1 | 1/2010 | Bromley et al. | |
| 7,685,565 B1 | 3/2010 | Kawachiya | |
| 8,230,059 B1 | 7/2012 | Santos et al. | |
| 8,239,840 B1 | 8/2012 | Czymontek | |
| 8,714,986 B2 | 5/2014 | Dodelson et al. | |
| 8,750,782 B2 | 6/2014 | Scandura | |
| 8,924,926 B1* | 12/2014 | Fraser | G06F 3/04842 717/105 |
| 2001/0039552 A1* | 11/2001 | Killi | G06F 9/4446 715/234 |
| 2002/0087416 A1 | 7/2002 | Knutson | |
| 2003/0034998 A1* | 2/2003 | Kodosky | G05B 19/0426 715/736 |
| 2004/0039993 A1 | 2/2004 | Kougiouris et al. | |
| 2004/0076941 A1 | 4/2004 | Cunningham et al. | |
| 2004/0078785 A1 | 4/2004 | Dutt et al. | |
| 2004/0209231 A1 | 10/2004 | Merritt | |
| 2004/0229194 A1 | 11/2004 | Yang | |
| 2004/0259060 A1 | 12/2004 | Kumar et al. | |
| 2005/0079477 A1 | 4/2005 | Diesel et al. | |
| 2005/0089825 A1 | 4/2005 | Zulferino | |
| 2005/0147946 A1* | 7/2005 | Ramamurthy | G06Q 99/00 434/118 |
| 2005/0175970 A1 | 8/2005 | Dunlap et al. | |
| 2006/0130007 A1* | 6/2006 | Ackerman | G09B 19/0053 717/136 |
| 2006/0179420 A1 | 8/2006 | Ebrahimi | |
| 2006/0253508 A1 | 11/2006 | Colton et al. | |
| 2007/0130112 A1 | 6/2007 | Lin | |
| 2007/0130530 A1* | 6/2007 | Anderson | G06F 8/34 715/762 |
| 2007/0168946 A1 | 7/2007 | Drissi et al. | |
| 2008/0305460 A1 | 12/2008 | Garg | |
| 2009/0070147 A1 | 3/2009 | Kashani et al. | |
| 2009/0138415 A1 | 5/2009 | Lancaster | |
| 2009/0311657 A1 | 12/2009 | Dodelson et al. | |
| 2010/0042969 A1 | 2/2010 | Ackerman | |
| 2010/0050151 A1 | 2/2010 | Balasubramanian | |
| 2010/0058212 A1 | 3/2010 | Belitz et al. | |
| 2010/0227301 A1 | 9/2010 | Yu et al. | |
| 2011/0047516 A1* | 2/2011 | Pavan | G06Q 10/06 715/853 |
| 2011/0081632 A1 | 4/2011 | Garg | |
| 2011/0125768 A1 | 5/2011 | Shibao | |
| 2011/0136083 A1 | 6/2011 | Morris et al. | |
| 2011/0270873 A1* | 11/2011 | Somanchi | G09B 5/00 707/769 |
| 2011/0304550 A1 | 12/2011 | Romera Jolliff et al. | |
| 2012/0121025 A1 | 5/2012 | Bonaparte et al. | |
| 2012/0124559 A1 | 5/2012 | Kondur | |
| 2013/0006609 A1 | 1/2013 | Dhoolia et al. | |
| 2013/0130217 A1 | 5/2013 | Dohring et al. | |
| 2013/0239090 A1* | 9/2013 | Hamlin | G06F 8/34 717/123 |
| 2013/0311416 A1 | 11/2013 | Rua Liu et al. | |
| 2014/0057231 A1 | 2/2014 | Lutz et al. | |
| 2014/0113257 A1 | 4/2014 | Spiridonov et al. | |
| 2014/0129331 A1 | 5/2014 | Spivack et al. | |
| 2014/0170606 A1 | 6/2014 | Chong et al. | |
| 2014/0287397 A1 | 9/2014 | Chong et al. | |
| 2014/0359558 A1* | 12/2014 | Chamberlain | G06F 8/34 717/105 |
| 2014/0373137 A1 | 12/2014 | Muttik | |
| 2014/0379602 A1 | 12/2014 | Nelson et al. | |
| 2015/0044642 A1* | 2/2015 | Resig | G06F 8/33 434/118 |
| 2015/0220312 A1* | 8/2015 | Jemiolo | G06F 17/3089 715/234 |
| 2015/0347274 A1 | 12/2015 | Taylor et al. | |
| 2016/0093232 A1 | 3/2016 | Chong et al. | |

OTHER PUBLICATIONS

ElectricSparx, 'Comment Block EDITED' Apr. 22, 2008, Scratch projects, <http://scratch.mit.edu/projects/147451/>.*

Systems and Methods for Goal-based Programming Instruction, U.S. Appl. No. 13/837,719, filed Mar. 15, 2013, Kelvin Chong, et al.

Systems and Methods for Customized Lesson Creation and Application, U.S. Appl. No. 14/180,253, filed Feb. 13, 2014, Kelvin Chong, et al.

Integrated Development Environment for Visual and Text Coding, U.S. Appl. No. 14/503,058, filed Sep. 30, 2014, Kelvin Chong, et al.

U.S. Appl. No. 14/503,058, filed Sep. 30, 2014, Kelvin Chong et al.

* cited by examiner

PROGRAMMING LEARNING CENTER

BACKGROUND

Computers are ubiquitous and used for business, education, recreation and so on. Familiarity with the principles of computer programming and experience in computer programming is a useful skill. While familiarity with commonly used programming languages may be beyond the competency of many younger children, even at a young age children can learn the basic principles of computer programming.

BRIEF DESCRIPTION OF DRAWINGS

FIG. 3 is a simplified diagram illustrating operation of a graphics user interface used to program a project that runs within a learning center runtime for the learning center shown in FIG. 1 in accordance with an implementation.

FIG. 11, FIG. 12 and FIG. 13 are simplified diagrams illustrating operation of a graphics user interface used to run lesson modules within a learning center runtime in accordance with an implementation.

DETAILED DESCRIPTION

Figure 1:
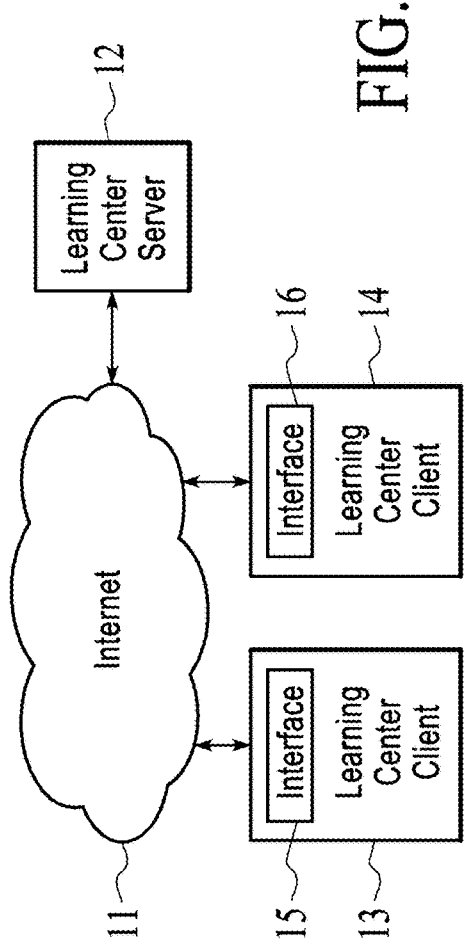
FIG. 1 is a simplified block diagram of a learning center that teaches basic programming principles in accordance with an implementation.

FIG. 1 is a simplified block diagram of a learning center that includes a learning center server 12 that can be accessed through the Internet 11 by multiple learning center clients. Multiple learning center clients are represented in FIG. 1 by a learning center client 13 and a learning center client 14. Learning center client may be implemented, for example, on a personal or laptop computer, a tablet computer, a smart phone, or any other computing device capable of accessing learning center server 12 through the internet 11. An interface 15 within learning center client 13 is, for example a web browser or specialty software that allows a user to interact with learning center 12 through internet 11. Likewise, an interface 16 within learning center client 14 is, for example a web browser or specialty software, such as an app, that allows a user to interact with learning center 12 through internet 11.

For example, the learning center integrates social learning and unique game mechanics with a guided curriculum to deliver a highly engaging and rewarding experience to children of all ages. The learning center allows children to perform creative activities such as write digital storybooks and scrapbooks, build video games, animate their favorite characters and share these with friends and family.

Figure 2:
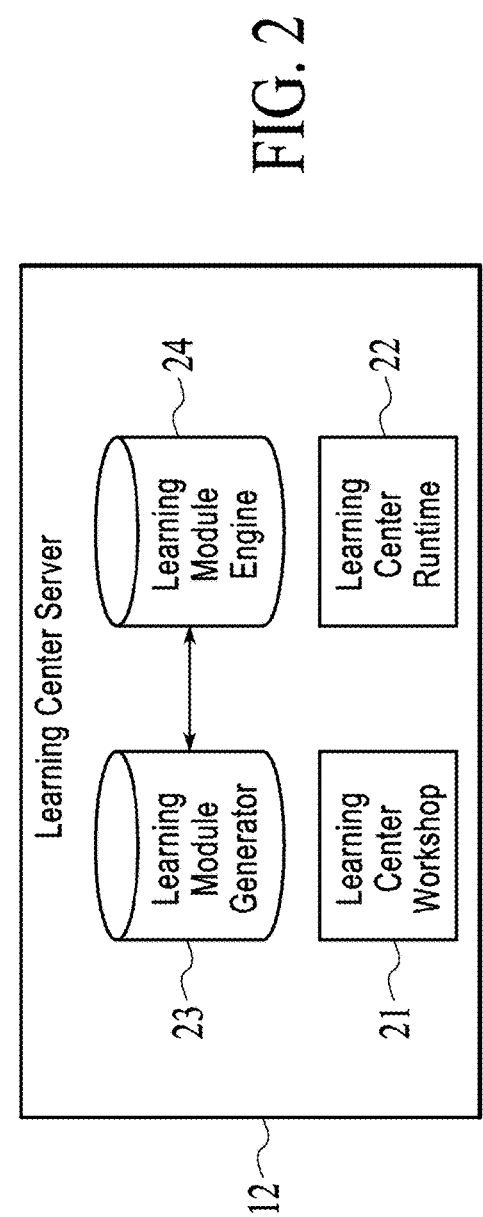
FIG. 2 is a simplified block diagram of a learning center server of the learning center shown in FIG. 1 in accordance with an implementation.

FIG. 2 is a simplified block diagram showing that learning center server 12 includes a learning center workshop 21, a learning center runtime 22, a learning module generator 23 and a learning module engine 24.

Learning center workshop 21 allows a user on a learning center client to build learning center programs visually using the interface for the learning center client. Learning center runtime 22 allows a user on a learning center client to run learning center programs.

Learning module generator 23 allows a user on a learning center client to generate learning modules from learning center programs. Learning module engine 24 allows a user on the learning center client to run learning modules and guides the user to build a learning center program. The learning module engine validates all known triggers and keeps parameters within a known range.

Table 1 below, sets out an example of a language specification for the learning center.

TABLE 1

```
<scripts> ::= <script> | <script> <scripts>
<script> ::= <entry-block> <blocks>
<blocks> ::= {empty} | <exit-block> | <inline-block> <blocks>
<inline-block> := <container-block> | <block>
<entry-block> ::= <label>
<exit-block> ::= <label>
<block> ::= <label>
<container-block> ::= <label> <containers>
<containers> ::= <container> | <container> <containers>
<container> ::= "{" <blocks> "}"
<label> ::= {string} <params>
<params> ::= {empty} | <param> <params>
<param> ::= {string} | {number} | {boolean} | <label-block>
<label-block> ::= {string} <params>
```

Table 2 below, sets out an example of language blocks for the learning center.

TABLE 2

```
CONTROL
on start
when {choice:keys} pressed
when actor clicked
broadcast {events}
broadcast {events} and wait
send message {events} to
{actor} with {string}
send message {events} to
```

TABLE 2-continued

{actor} with {string} and wait
received value
received source
when I receive {events}
clone startup
wait {number:1} secs
forever
repeat {number:10}
create clone of {actor}
name of last cloned actor
delete this clone
forever if {boolean}
if {boolean}
if {boolean} else
wait until {boolean}
repeat until {boolean}
stop {choice:stop}
stop script
stop all
MOTION
move {number:10} steps
turn CW {angle:15} degrees
turn CCW {angle:15} degrees
point in direction {angle:90} degrees
point towards {where}
go to x: {number:0} y: {number:0}'
blockMotionGoTowards
glide {number:1} secs to x: {number:0} y: {number:0}
change x by {number:10}'
set x to {number:0}
change y by {number:10}'
set y to {number:0}
if on edge, bounce
x position
y position
direction
LOOKS
switch to costume {costumes}
next costume
costume #
set label to {string:Hello}
say {string:Hello} for {number:2} secs
say {string:Hello}
think {string:Hmm} for {number:2} secs
think {string:Hmm}
change {choice:effect} effect by {number:25}
set {choice:effect} effect to {number:0}
clear graphic effects
change size by {number:10}
set size to {number:100}%
size #
show
hide
go to front
go to back
go back {number:1} layers
go forward {number:1} layers
switch to background {costumes}
next background
background #
SENSING
touching {where}?
touching color {color}?
color {color} is touching {color}?
ask {string:What is your name} and wait
answer
mouse x
mouse y
mouse down?
key {choice:keys} pressed?
distance to {whereall}?
reset timer
timer
{choice:spriteprop} of {whereall}
name of actor {number}
# of actors
loudness
loud?
sensor {string:button pressed}?

TABLE 2-continued sensor {string:button pressed}?
{choice:datetime} of date/time
screen left
screen right
screen top
screen bottom
SOUND
play sound {sounds}
play sound {sounds} until done
stop all sounds
play drum {choice:instrument} for {number:0.2} beats
rest for {number:0.2} beats
play note {number:60} for {number:0.5} beats
set instrument to {choice:instrument}
change volume by {number:−10}
set volume to {number:100}%
volume
change tempo by {number:20}
set tempo to {number:60} bpm
tempo
OPERATOR
{number} + {number}
{number} − {number}
{number} * {number}
{number} / {number}
pick random {number:1} to {number:10}
{string} < {string}
{string} = {string}
{string} > {string}
{boolean} and {boolean}
{boolean} or {boolean}
not {boolean}
join {string:hello} {string:world}
letter {number:1} of {any:world}
length of {string:world}
{number} mod {number}
round {number}
{choice:math} of {number:10}
{choice:constants}
PEN
clear
pen up
set pen color to {color}
change pen color by {number:10}
set pen color to {number:0}
change pen shade by {number:10}
set pen shade to {number:50}
change pen size by {number:1}
set pen size to {number:1}
stamp
set font to {choice:fontstyle} {choice:fontsize} {choice:font}
draw text {string}
when drawing actor
redraw actor
set fill color to {color}
no fill
draw bezier at x1:{number:0} y1:{number:0} to x2:{number:0} y2:{number:0} with control points cx1:{number:0} cy1:{number:0} and cx2:{number:0} cy2:{number:0}'
draw point at x:{number:0} y:{number:0}
draw line from x1:{number:0} y1:{number:0} to x2:{number:0} y2:{number:0}
draw rectangle at x:{number:0} y:{number:0} with width:{number:0} height:{number:0}
draw triangle with points x1:{number:0} y1:{number:0} x2:{number:0} y2:{number:0} x3:{number:0} y3:{number:0}
draw ellipse at x:{number:0} y:{number:0} with width:{number:0) height:{number:0}
draw text {string} at x:{number:0} y:{number:0}
draw rectangle with width:{number:0} height:{number:0}'
draw ellipse with width:{number:0} height:{number:0}
PHYSICS
when actor collides
collided with {where}?
apply force {number:0}
apply impulse {number:0}
apply force {number:0} at {number:0} degrees
apply impulse {number:0} at {number:0} degrees TABLE 2-continued apply horizontal {number:0} and vertical {number:0} force
apply horizontal {number:0} and vertical {number:0} impulse
apply torque {number:0}
set static {boolean}
set shape to {choice:geometry}
set density to {number:10}
set friction to {number:0.5}
set restitution to {number:0.2}
set angular damping to {number:0}
set angular velocity to {number:0}
set linear damping to {number:0}
set linear velocity to {number:0} by {number:0}
density
friction
restitution
angular velocity
liertia
is awake?
x linear velocity
y linear velocity
set gravity to {number:0} by {number:10}
start physics
stop physics
VARIABLES
set {properties} of {actor} to {string:0}
property {properties} of {actor}
set {variables} to {string:0}
change {variables} by {number:1}
show variable {variables}
hide variable {variables}
LISTS
add {string:thing}to {lists}
delete {choice:lastall} of {lists}
insert {string:thing} at {choice:lastany} of {lists}
replace item {choice:lastany} of {lists} with {string:thing}
item {choice:lastany} of {lists}
length of {lists}
{lists} contains {string:thing}

A user from a learning center client accesses learning center workshop 21 through an interface. For example, the interface is a web browser or a dedicated app located on a computing device such as a personal computer or a tablet. When learning is launched, a user can build a project, which is essentially a computer program. Learning center workshop 21 allows a user to construct a project (computer program) and save it. The computer program can be run using learning center runtime 22.

Upon entering learning center workshop 21, a user can elect to build a new computer program from scratch or open an existing computer program.

To build a computer program from scratch, the user utilizes blocks of programming instructions represented visually as building blocks within learning center workshop 21. The tools provided within learning center workshop 21 allow a user to create a scene that includes a background, main objects and actors. Learning center workshop 21 allows a user to add computer program logic to the actors and the background. The user acts by dragging and dropping visual blocks into code areas. The visual blocks snap into place to form logic sequences.

Learning center workshop 21 saves the computer program and all its assets as the computer program is being built. For example, learning center workshop 21 saves the computer program in a persistent format so that the computer program can be loaded later. This can be done, for example in a Javascript Object Notation (JSON) format, Extensible Markup Language (XML) or some other structured syntax. The computer program file may be stored on learning center server 12 and, in addition or instead of, stored on the learning center client used by the user.

Figure 3:
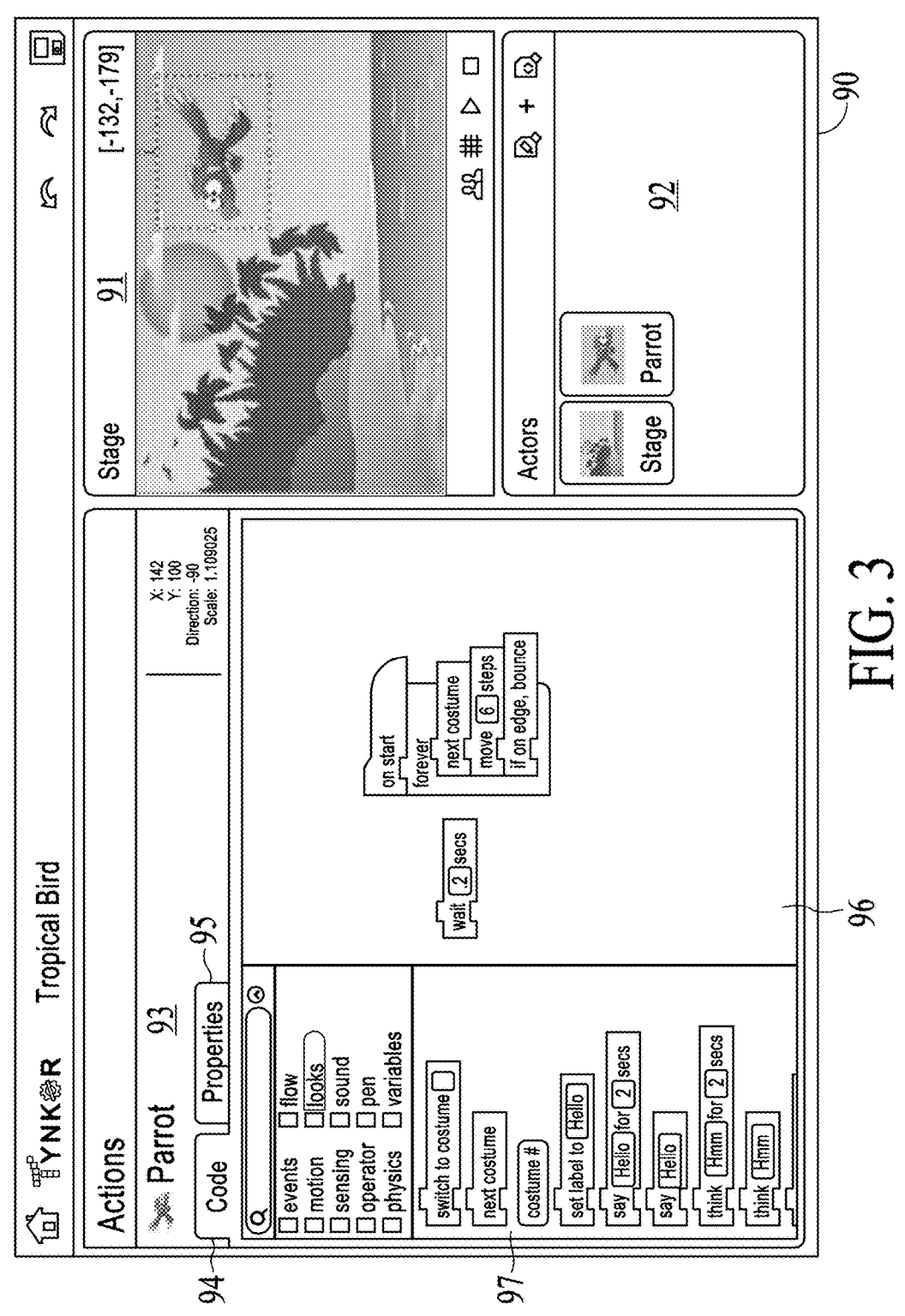

FIG. 3 shows a user interface 90 for learning center workshop 21. An area 90 shows a stage area where selected stages and actors are displayed. An actor area 92 shows available actors that can be selected by a user. A horizontal bar 93 includes a code tab 94 and a properties tab 95. When code tab 94 is selected available code blocks are shown displayed and available in a code block area 97. The code blocks can be dragged and dropped by a user into work area 96 to form a computer program (project).

The flying bird project illustrated within interface 90 shown in FIG. 3 can be stored in file using language blocks for the learning center. For example, Table 3 below sets out contents for such a file.

TABLE 3

{"name":"Tropical Bird","description":"Help the tropical bird fly out to sea.","background":
{"scaleType":"stretch","width":-.-600,"height":-.-400,
"canvasWidth":480,"canvasHeight":320,"currentBackground":
1,"scripts":[ ],"backgrounds":[{"name":"beach","img":"/assets/Images/Backgrounds/Outdoor/
4fcf9088692f886b16000e53.jpg","cx":512,"cy":341.5 }],"sounds":[ ],"
documentation":
{"description":"","inboundEvents":[ ],"outboundEvents":[ ],"properFes
":[ ]}},"sprites":[{"label":"Parrot","scripts":
[{"func":"registerFlagTrigger","id":6,"values":[ ],"containers":[ ],"next
":{"func":"blockControlForever","id":7,"values":
[ ],"containers":[{"func":"blockLooksNextCostume","id":8,"values":[ ],
"containers":[ ],"next":
{"func":"blockControlWait","id":9,"values":[{"type":"number","value
":".2"}],"containers":[ ],"next":
{"func":"blockMotionMove","id":11,"values":[{"type":"number",
"value":"6"}],"containers":[ ],"next":
{"func":"blockMotionBounceOnEdge","id":13,"values":[ ],"containers
":[ ]}}}}]},"x":82,"y":43}],"costumes":
[{"name":"Bird
1 ","img":"/assets/user/50312c85692f88c95000006b.png"},{"name
":"Bird 2","img":"/assets/user/
50312caa692f88ba5000007f.png","cx":80.5,"cy":56.5},{"name":"Bird
3","img":"/assets/user/
50312cb1692f88d550000075.png","cx":80.5,"cy":56.5},{"name":"Bird
4","img":"/assets/user/
50312cb6692f88e050000078.png","cx":80.5,"cy":56.5}],
"currentCostume":4,"sounds":[ ],"scale":
1.1090254493487,"x":142.77345132738003,"y":100.08159722222,
"rotation":180,"rotateLock":
1,"isHidden":false,"volume":100,"locked":false,"physics":
{"isStaFc":false,"isAcFve":true,"geometry":"circular","density":1,
"friction":0.5,"resFtution":0.2},"varDefaults":
{ },"variables":{"auto start":true,"distance":6},"lists":
{ },"classname":"Parrot","id":"50369e94692f885c770000c2",
"documentation":{"description":"Parrot flies around and
screeches.","inboundEvents":[{"name":"[registerFlagTrigger]",
"description":"","visible":true}],"outboundEvents":
[ ],"properFes":[{"name":"auto start","description":"If auto start=true,
animate on start","visible":true},
{"name":"distance","description":"Speed of
movement","visible":true}]}}],"models":[ ],"variables":{ },"lists":
{ },"physics":{"enabled":false,"gravity":{"x":0,"y":10}}}

A user can use learning center runtime 22, shown in FIG. 1, to run a computer program built in learning center workshop 21. For example, the interface by which the user accesses learning center runtime 22 is a web browser on a computing device such as a personal computer or a tablet or is an app running on a mobile phone or tablet computer. For example, the user may iterate through refining a computer program by making modifications such as adding and removing logic, changing the code blocks used and testing the computer program to see how the computer program runs.

Figure 4:
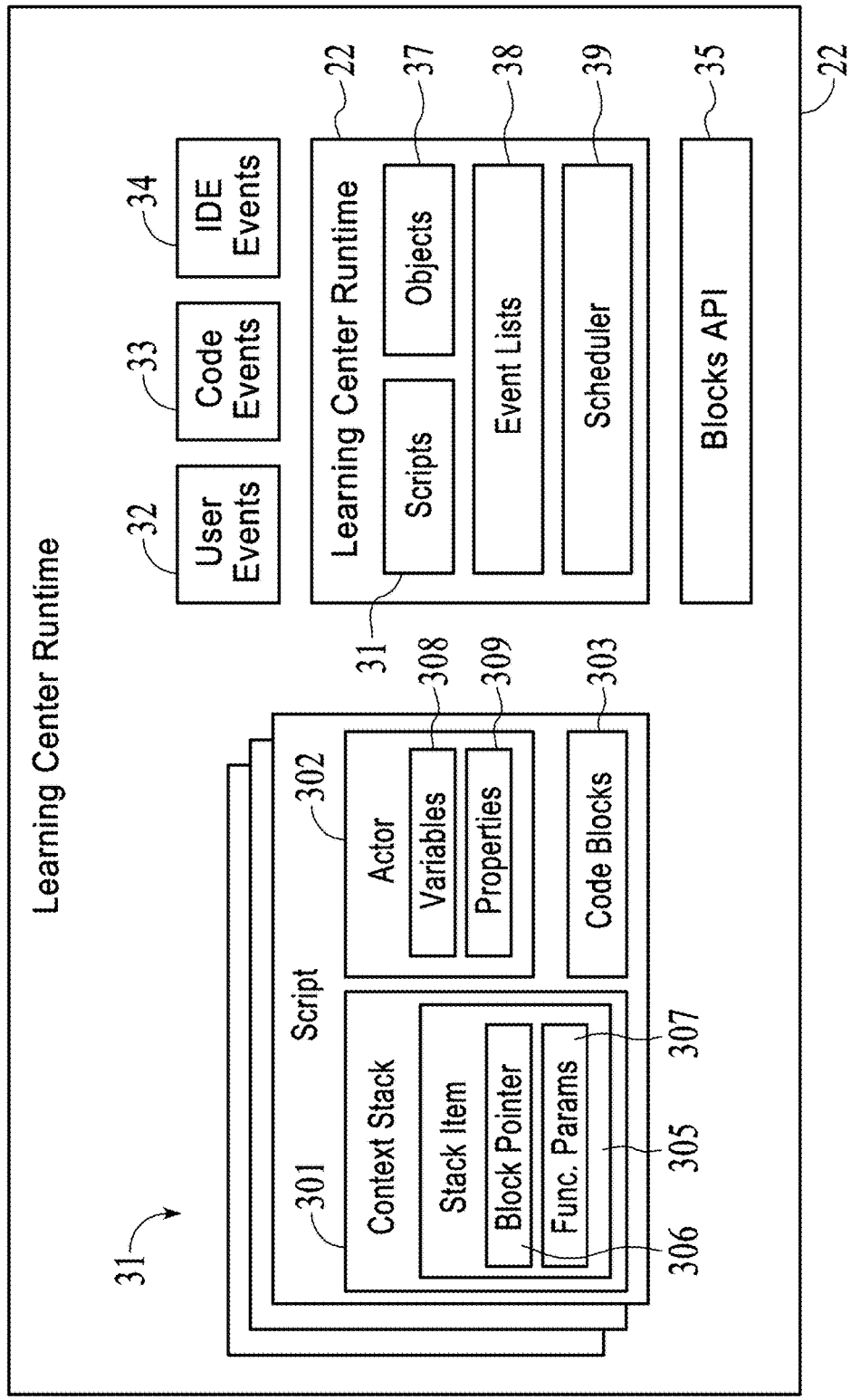
FIG. 4 is a simplified block of a learning center runtime for the learning center shown in FIG. 1 in accordance with an implementation.

FIG. 4 shows a simplified block diagram for learning center runtime 22. Learning center runtime 22 is shown to include scripts 31, objects 37, event lists 38 and a scheduler 39. User events 32, code events 33 and integrated development events (IDE) 34 are used to invoke learning center runtime 22. Learning center runtime 22 calls application programming interface (API) blocks. FIG. 4 also shows a script containing, for example, a context stack 301, an actor description 302 and code blocks 303. The context stack includes stack items represented by a stack item 305 having a block pointer 306 and function parameters 307. Actor description 302 includes variables 308 and properties 309.

Figure 20:
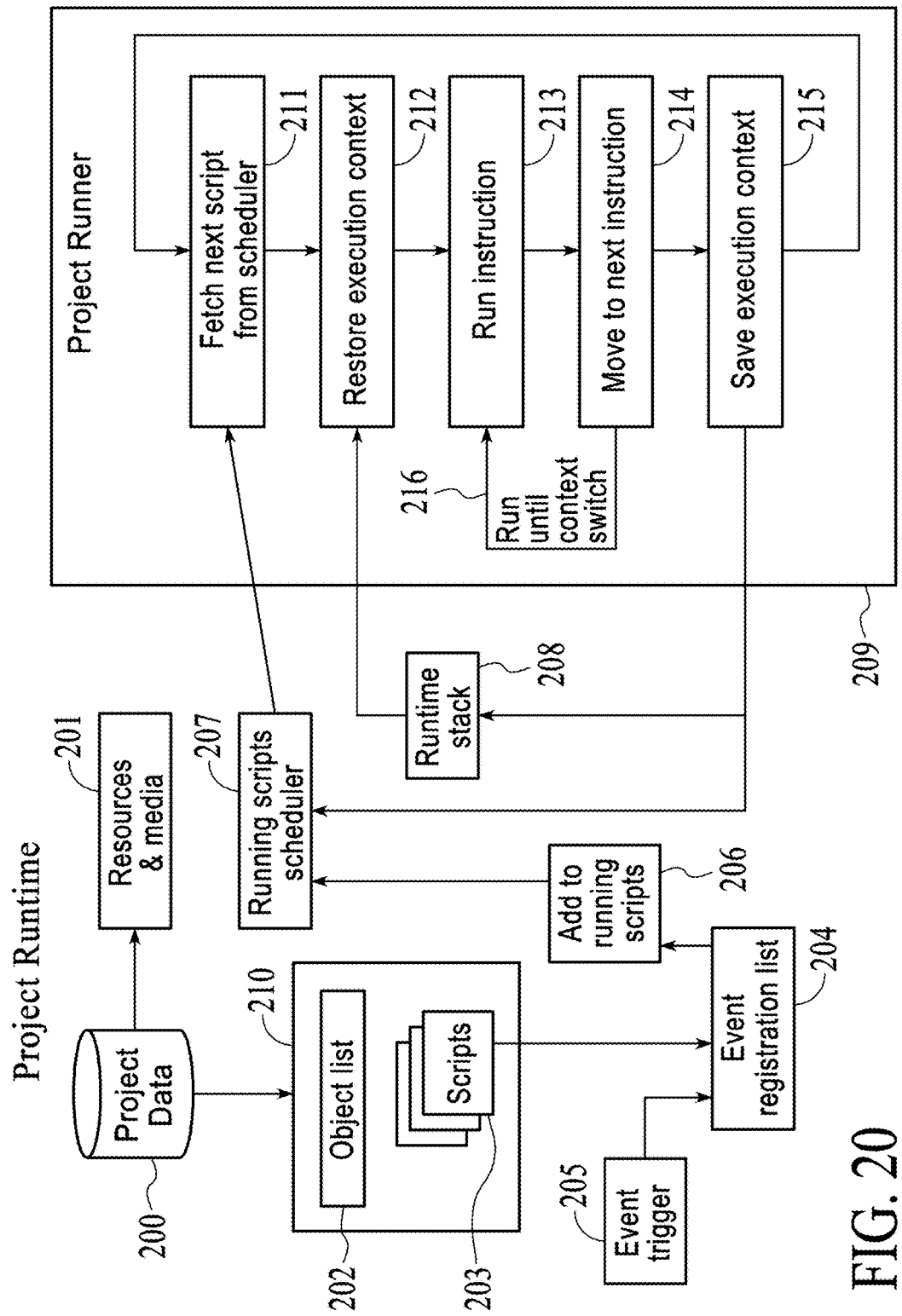
FIG. 20 is a block diagram illustrating a project runtime in accordance with an implementation.

FIG. 20 is a block diagram illustrating implementation of a project runtime. Project data 200 can utilize resources and media 201. When a project is loaded, the project is parsed and added to object lists for each object (actor). Each object entry in the object list maintains a reference to the scripts associated with an object (actor). The project resource and media pointers are referenced by various instructions in the scripts. For example a loaded project 210 includes, for example, an object list 202 and scripts 203.

Scripts are registered against specific event types (e.g. program start, key event, mouse event). As illustrated by arrow 206, an external trigger event 205 results in a script 203 that has been registered in event registrations list 204 being added to a scheduler 207, which is a list of running scripts. Run loop 209 picks up a script to execute from scheduler 207. The scripts are executed in parallel by scheduler 207. Scheduler 207 determines how to select the next script (e.g. round robin, priority queue, time queue). The execution context is restored from a runtime stack 208 specific to that script. The instruction is executed as a non-blocking process.

For example, within a project runner 209, in a block 211 a next script is fetched from the scheduler. In a block 212, execution context is restored for the fetched script. In a block 213 an instruction is run. In a block 214, context is moved to a next instruction. As illustrated by arrow 216, block 213 and block 214 are continued until there is a context switch. A context switches occurs, for example, when the script has executed a yield instruction, a time slice expires, user interrupts execution, etc. When there is a context switch, in a block 215, execution context is saved and context is returned to block 211. If the end of the script has not been reached, the script is retained in the scheduler 207. If the end of the script has been reached, the script is removed from runtime stack 208 and the list of running scripts within scheduler 207.

For example, for learning center runtime 22, scripts 31 are written using Javascript. Javascript is a single-threaded environment in a web browser. A sequence of instructions is executed sequentially until the sequence relinquishes control back to the web browser before other instruction sequences will execute. As a result, multiple Javascript sequences cannot run at the same time.

For example, the learning center represents instructions as blocks so that each block represents one instruction that executes atomically, that is without being interrupted by another block. Each block must relinquish control back to the web browser in a timely fashion. Scheduler 39, therefore, maintains a context for each script sequence. Scheduler 39 selects a script sequence, switches to that script's context and executes a predetermined number of blocks for each turn. Scheduler 39 then selects the next script sequence and repeats until all scheduled scripts have run theft turn. At this point scheduler 39 relinquishes control back to the web browser. The web browser starts up another time slice where another script sequence is executed. As a result, multiple scripts 31 can be run at the same time.

Figure 5:
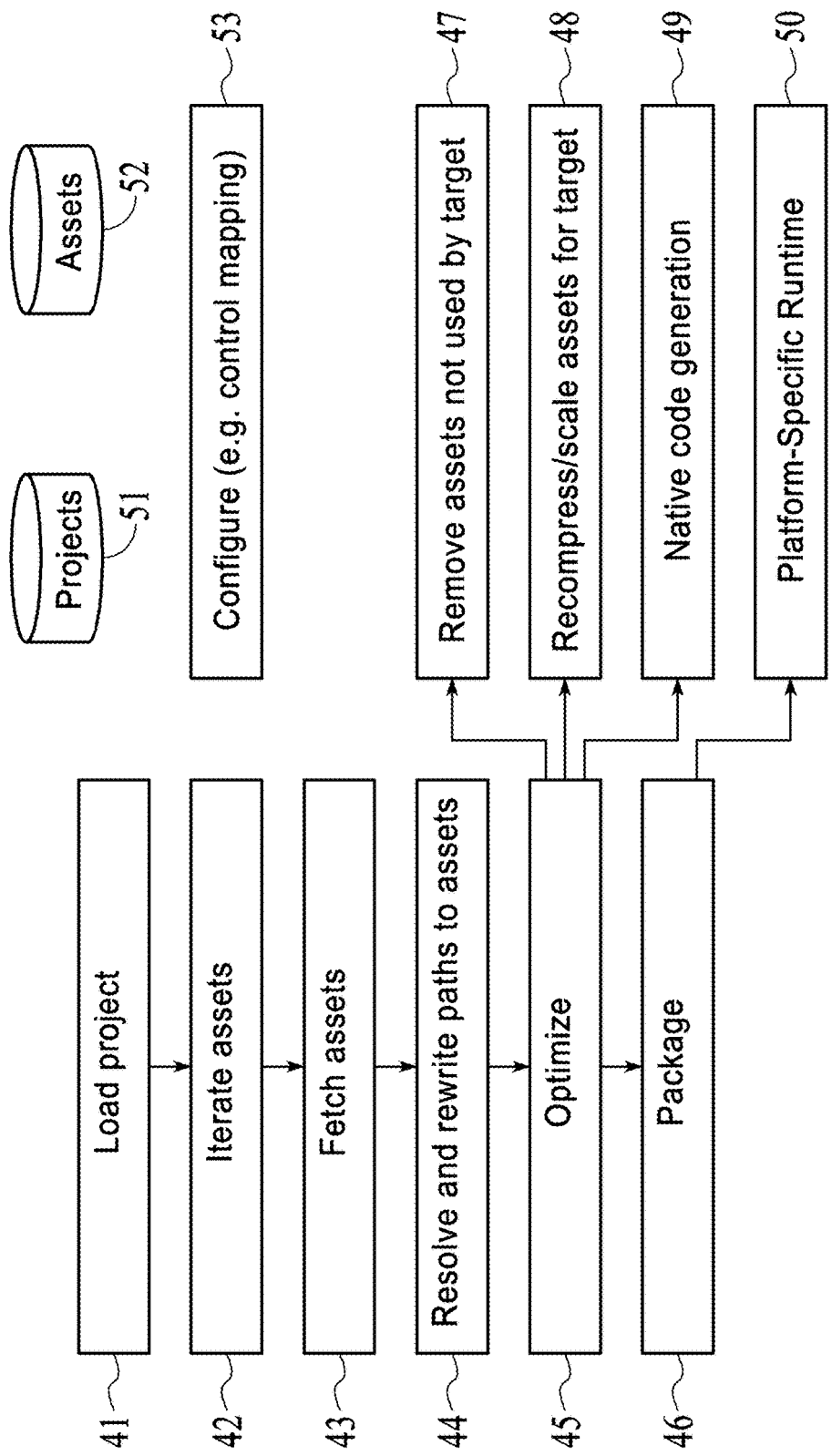
FIG. 5 is a simplified flowchart that describes publication to runtime of a project designed to run within a learning center runtime for the learning center shown in FIG. 1 in accordance with an implementation.

FIG. 5 is a simplified flowchart illustrating learning center workshop 21 publishing a project (learning center program) to learning center runtime 22. As illustrated in FIG. 5, storage for projects 51 and storage for assets 52 are accessed to obtain a project and associated assets. Also configuration (such as user input control mapping, display scaling, desired screen orientation) information 53 is also accessed.

In a block 41, a project is loaded. In a block 42, assets are iterated. In a block 43, assets are fetched from assets storage 52. In a block 44, paths to assets are resolved and rewritten. In a block 45, optimization is performed. For example, the optimization can include removing assets not used by a target, as shown in a block 47. Likewise, the optimization can include recompressing and/or scaling assets for the target, as shown in a block 48. Also, the optimization can include native code generation, as shown in a block 49.

In a block 46 the project is packaged based on a platform specific runtime, as illustrated by a block 50.

Once a computer program (project) is complete, a user can choose to create a lesson module based on the computer program. For example, the user can choose a create lesson option in learning center workshop 21 to activate learning module generator 23.

Learning module generator 23 includes a parser that parses through the computer program that the user built and generates a task list for the lesson module. For example, learning module generator 23 reads through the computer program, identifies all objects and identifies actions to recreate the computer program. Then, different kinds of steps are generated based on the results of parsing the computer program. A list of ordered steps are generated where complex tasks are outlined and grouped together.

Figure 6:
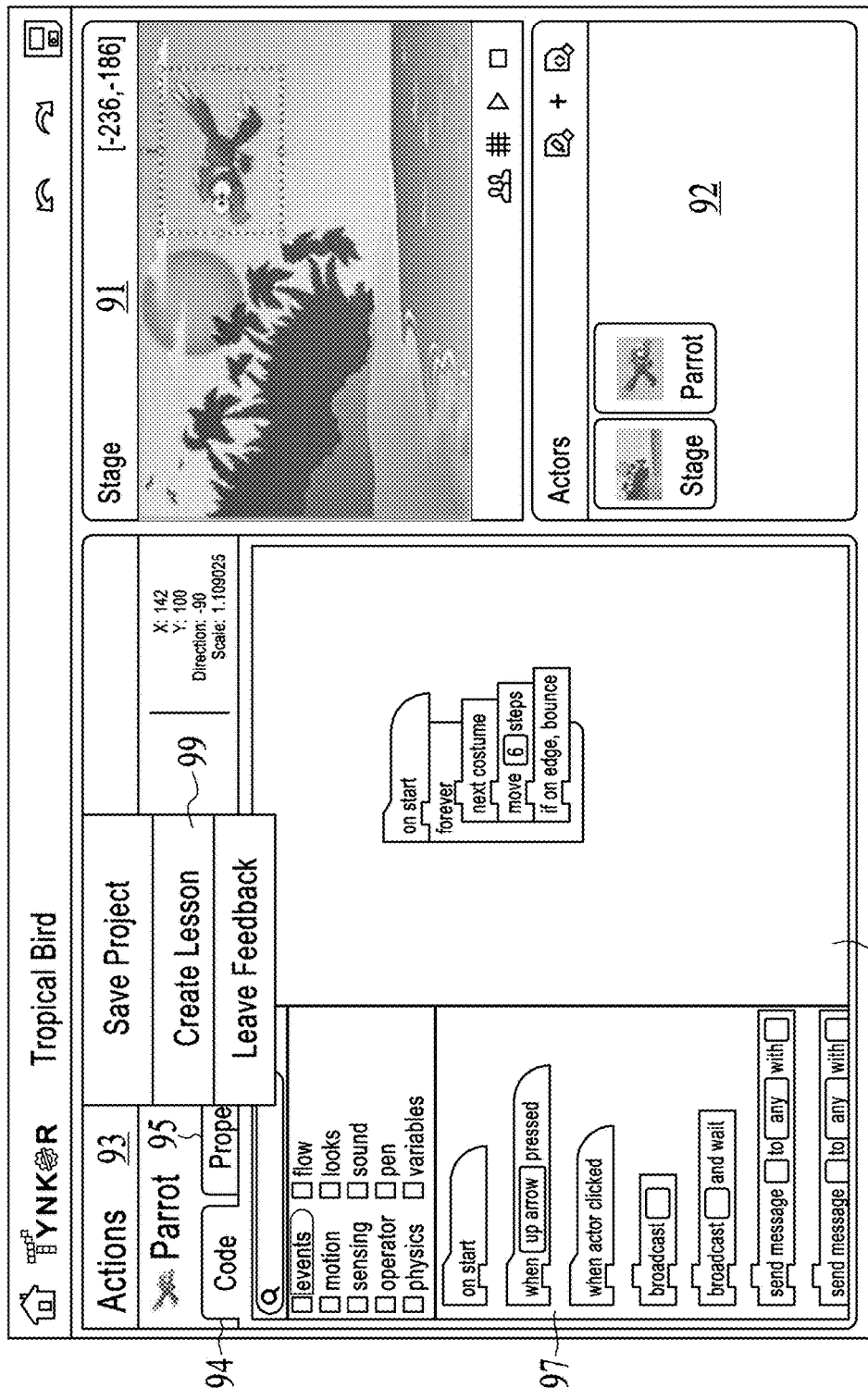
FIG. 6 and FIG. 7 are simplified diagrams illustrating operation of a graphics user interface used to generate lesson modules for a project designed to run within a learning center runtime in accordance with an implementation.

As shown in FIG. 6, a drop down menu 99 accessed by a user from the "Tropical Bird" label on the menu bar of user interface 90 includes a selection to "Create Lesson". As a result, learning module generator 23 (shown in FIG. 2) is invoked and generates a lesson module from the computer program (shown in Table 3) for the flying bird project.

Figure 7:
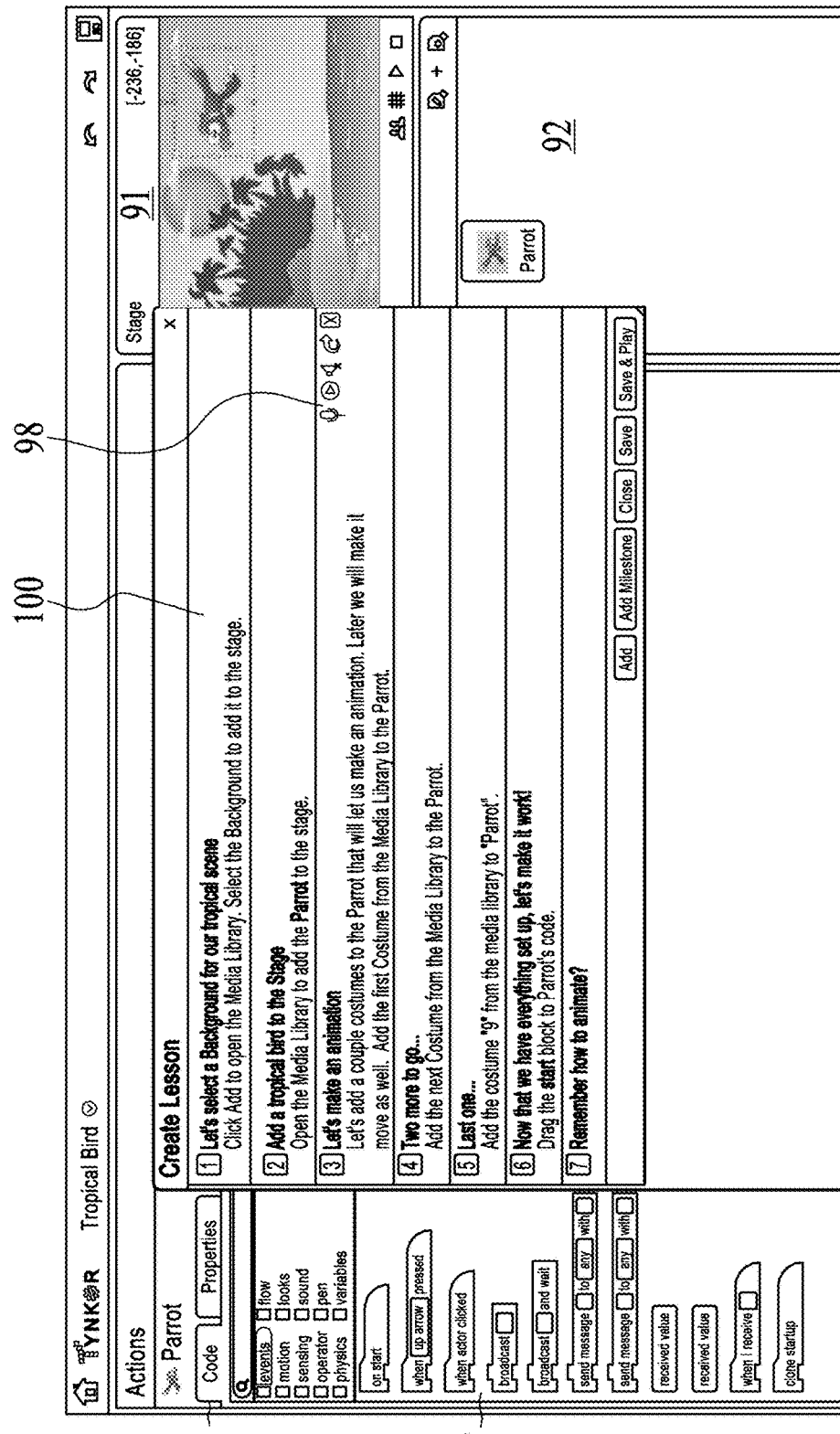

FIG. 7 shows in box 100, appearing as part of interface 90, lesson steps. As discussed above, the author of the lesson module can modify the lesson module generated by changing the order of steps, adding voice over by selecting a voice over button 98, and so on.

Figure 8:
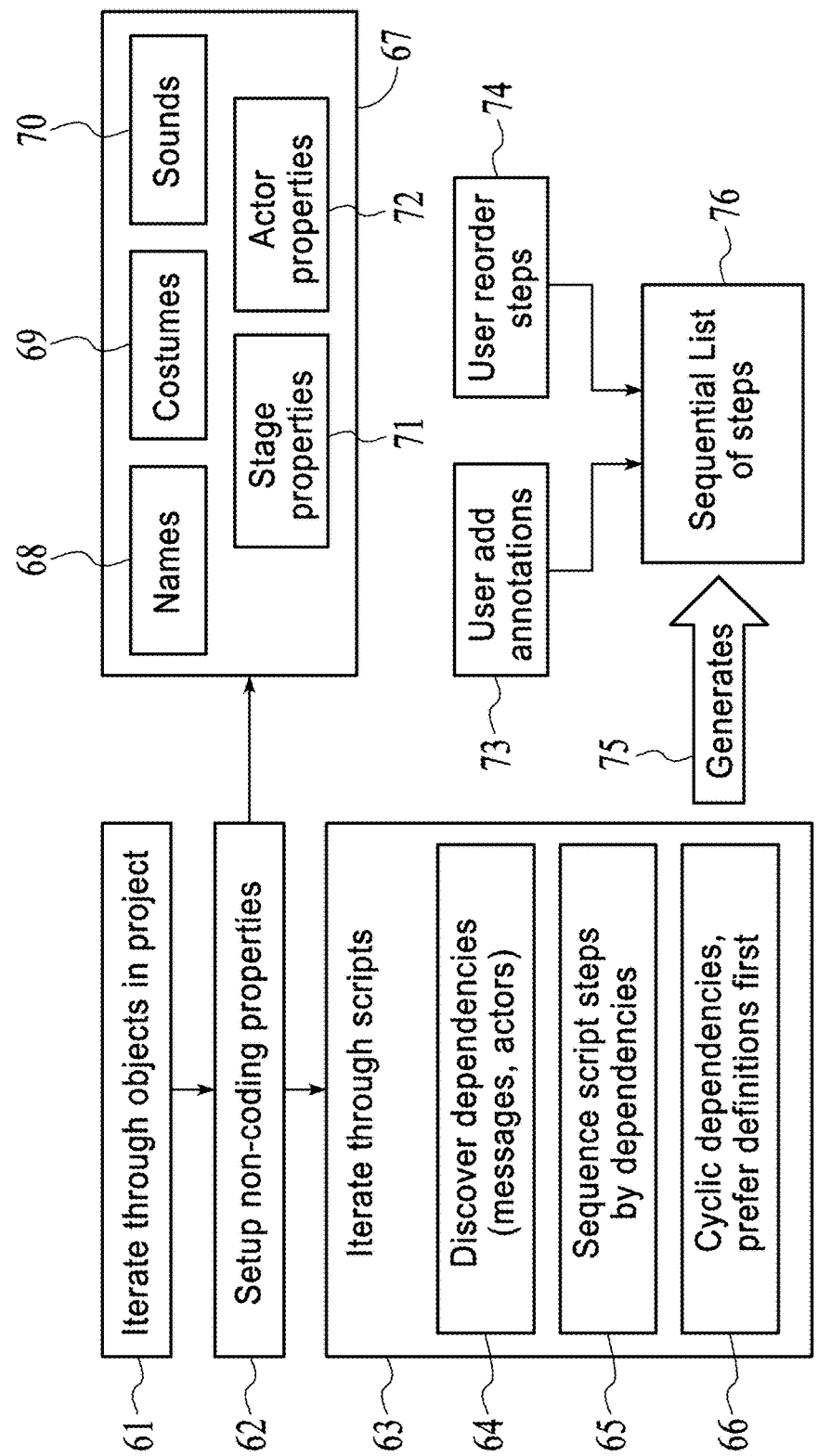
FIG. 8 and FIG. 9 are simplified flowcharts that describe generation of lesson modules for a project designed to run within a learning center runtime in accordance with an implementation.

FIG. 8 is a simplified flowchart showing how learning module generator 23 generates a lesson module from a computer program. In a block 61, learning module generator 23 iterates through objects in the project (computer program). In a block 62, learning module generator 23 sets up non-coding properties 67. Non-coding properties 67 include, for example, names 68, costumes 69, sounds 70, stage properties 71 and actor properties 72.

In a block 63, learning module generator 23 iterates through scripts. This is done, for example, to discover dependencies between messages and actors, etc., as shown in block 64, to sequence script steps by dependencies, as shown in block 65, and to determine cyclic dependencies and establish a preference for definitions, as shown in block 66.

As represented by arrow 75, learning module generator 23 then generates a sequential list of steps 76. As illustrated by block 73, a user can add notations to sequential list of steps 76. As illustrated by block 74, a user can reorder steps within sequential list of steps 76.

Once the list or ordered steps are generated, the user can customize the lesson module. For example, the user can change the order of steps so that the reconstruction of the steps of computer program occurs in a different order than the steps as they originally appeared in the in the computer program when authored. Learning module generator 23 is used to assure that dependencies between steps are accounted for.

For example, learning module generator 23 allows a user to add voice over in each step. The voice over is played back while the lesson module is being run within learning center runtime 22. Similarly, learning module generator 23 allows a user to add video in any step. The video is played back while the lesson module is being run within learning center runtime 22. Also, learning module generator 23 allows additional steps to be added in between the steps for the lesson module originally generated by learning module generator 23. For example, text for the lesson module can be customized. When the user has completed modifications, learning module generator 23 saves the workflow as a lesson module.

Figure 9:
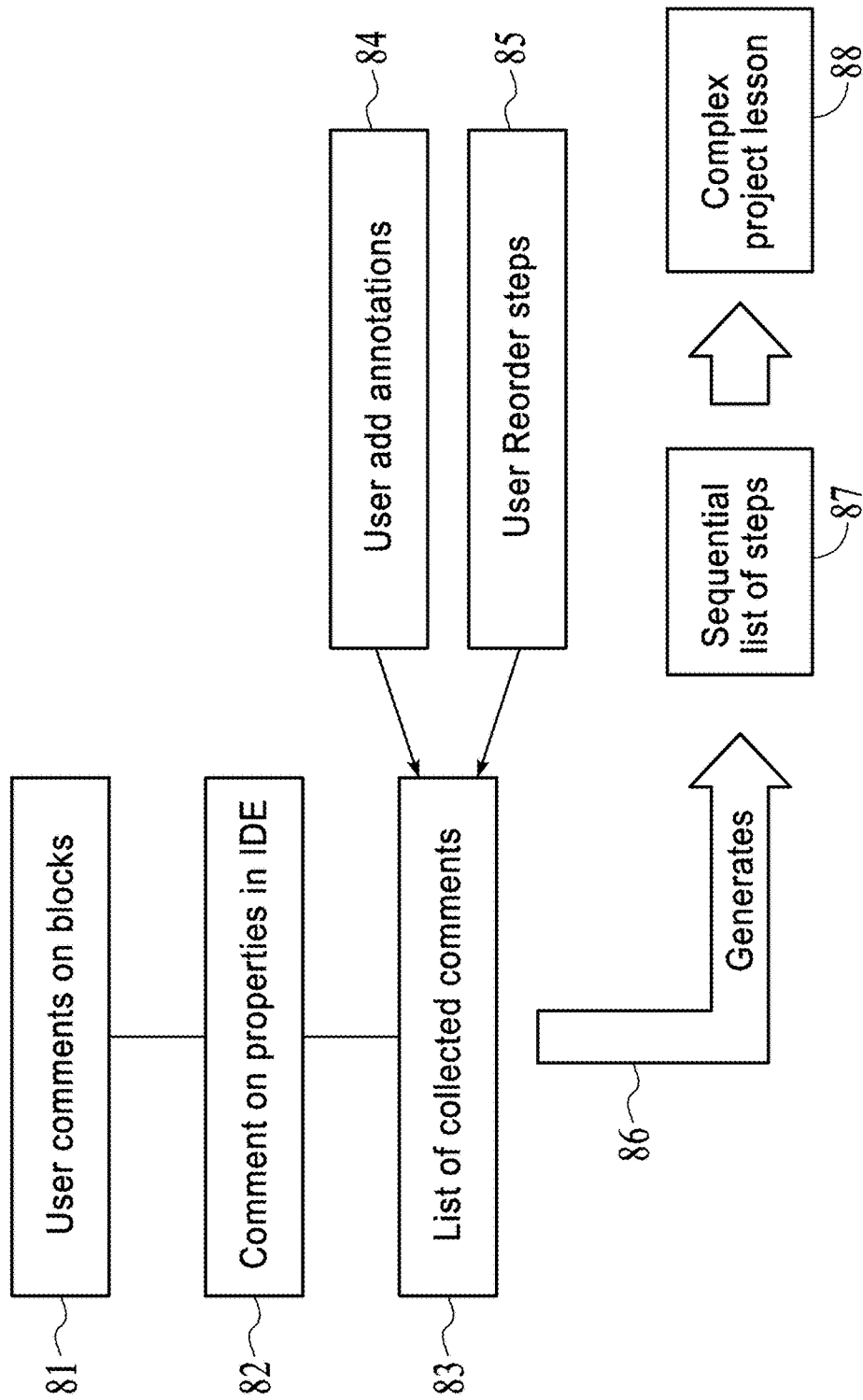

FIG. 9 illustrates an alternative method for generating a lesson module from a computer program. In a block 81, a user comments on blocks of programming code. In a block 82, the user comments on program properties in integrated development environment (IDE). Learning module generator 23 stores a list of collected comments 83 that includes additional user added annotations 84 and reordered steps 85. From list of collected comments 83, learning module generator 23 generates, as illustrated by an arrow 86 a new sequential list of steps 87 used to produce a complex project lesson module 88.

Table 4 shows an example of computer program for a complex project lesson produced based on language blocks from the flying bird project set out in Table 3:

TABLE 4

{"width":–600,"height":–400,"bgtype":"stretch","canvasWidth":480,"canvasHeight
":320,"name":"Tropical Bird","description":"Help the tropical bird fly out
to sea.", resources":[{"count":1,"name":"beach.jpg","img":
"\/assets\/Images\/
Backgrounds\/Outdoor\/4fcf9088692f886b16000e53.jpg"},{"count":1,"name":"
Bird 1.png","img":"\/assets\/user\/50312c85692f88c95000006b.png"},
{"count":1,"name":"Bird 2.png","img":"\/assets\/user\/
50312caa692f88ba5000007f.png"},{"count":1,"name":"Bird
3.png","img":"\/assets\/user\/50312cb1692f88d550000075.png"},{"count":1
,"name":"Bird 4.png","img":
"\/assets\/user\/50312cb6692f88e050000078.png"}],"blocks":
[{"count":1,"func":"registerFlagTrigger"},{"count":1,"func":"blockControl Forever"},
 {"count":1,"func":"blockLooksNextCostume"},{"count":1,"func":"blockControlWait"},
 {"count":1,"func":"blockMotionMove"},{"count":1,"func":
 "blockMotionBounceOnEdge"}],"notes":[{"block":null,"spriteName":null,
 "resource":"\/assets\/Images\/Backgrounds\/Outdoor\/4fcf9088692f886b16000e53.jpg",
 "resourceName":"beach","attached":null,"id":1,"text":"
Let's select a Background for our tropical scene<\/h2> Click Add to open the
 Media Library. Select the Background to add it to the stage.
 <\/p><\/div>\n"},{"block":null,"spriteName":"Parrot","resource":"\/assets\/user
 \/50312c85692f88c95000006b.png","resourceName":"Bird1",
 "attached":null,"properFes":{"x":442.77345132738,"y":99.91840277778,
 "rotation":180,"rotateLock":1,"scale":1.1090254493487},"id":2,"text":"
Add a tropical bird to the Stge<\/h2> Open the Media Library to add the
 Parrot<\/em> to the Stage.<\/p><\/div>\n"},{"block":null,"spriteName":
 "Parrot","resource":"\/assets\/user\/50312caa692f88ba5000007f.png",
 "resourceName":"Bird 2","attached":null,"id":3,"text":"
Let's make an animation<\/h2> Let's add a couple costumes to the Parrot that
 will let us make an animation. Later we will make it move as well. Add the
 first Costume from the Media Library to the Parrot.<\/p><\/div>\n"},
 {"block":null,"spriteName":"Parrot","resource":"\/assets\/user\/50312cb169
 2f88d550000075.png","resourceName":"Bird 3","attached":null,"id":4,
 "text":"
Two more to go...<\/h2> Add the next Costume from the Media Library to the
 Parrot.<\/p><\/div>\n"},{"block":null,"spriteName":"Parrot","resource":"\/assets
 \/user\/50312cb6692f88e050000078.png","resourceName":"Bird4",
 "attached":null,"id":5,"text":"
Last one...<\/h2>
Add the costume \"9\" from the media library to
 \"Parrot\".<\/p><\/div>\n"},{"block":"registerFlagTrigger","spriteName":
 "Parrot","resource":null,"attached":null,"id":6,"text":"
Now that we have everything set up, let's make it work!<\/h2>
Drag the start<\/em> block to Parrot's code.<\/p><\/div>\n"},
 {"block":"blockControlForever","spriteName":"Parrot","resource":null,"attached":
 ["registerFlagTrigger",6],"id":7,"text":"
Remember how to animate?<\/h2>
Just like we did in previous activities, start by adding the forever loop<\/em>
 block to the start<\/em> block in Parrot's
 code.<\/p><\/div>\n"},{"block":"blockLooksNextCostume","spriteName":
 "Parrot","resource":null,"attached":["blockControlForever",7,0],"id":8,"text":"
Adding animation logic to the Parrot<\/h2>
Add the next costume<\/em> block into the forever loop<\/em> block in
 Parrot's code. This allows us to keep changing costumes to get the
 animation effect<\/p><\/div>\n"},
 {"block":"blockControlWait","spriteName":"Parrot","resource":null,"attached":
 ["blockLooksNextCostume",8],"id":9,"text":"

TABLE 4-continued

```
Adding animation logic to the Parrot<\/h2>
Add the wait<\/em> block to the next costume<\/em> block in Parrot's code.
    Without a wait block, the Parrot flaps it's wings too fast. To get a better
    effect we need to slow it down.<\/p><\/div>\n"},
    {"block":null,"spriteName":"Parrot","resource":null,"attached":["blockControl
    Wait",9,0,".2"],"id":10,"text":"
Adjusting our animation<\/h2>
Set the value of the wait<\/em> block to .2<\/em> in Parrot's code. This will
    allow for a better animation effect by slowing down how fast the costumes
    change.<\/p><\/div>\n"},
    {"block":"blockMotionMove","spriteName":"Parrot","resource":null,
    "attached":["blockControlWait",9],"id":11,"text":"
Now that the Parrot knows how to fly, let's make it move<\/h2>
Add the move<\/em> block to the wait<\/em> block in Parrot's
    code.<\/p><\/div>\n"},{"block":null,"spriteName":"Parrot","resource":null,
    "attached":["blockMotionMove",11,0,"6"],"id":12,"text":"
Set the speed of the Parrot<\/h2>
The value of the move block determines the number of steps that the bird
    makes in every cycle of the loop. Set the value of the move<\/em> block to
    6<\/em> in the Parrot's code.<\/p><\/div>\n"},
    {"block":"blockMotionBounceOnEdge","spriteName":"Parrot","resource":
    null,"attached":["blockMotionMove",11],"id":13,"text":"
Last step, don't let the bird fly away<\/h2>
If we were to run the program right now, the bird would just fly off the Stage.
    We can easily fix this by adding the bounce on edge<\/em> block to the
    move<\/em> block in the Parrot's code. This is the easiest way to make
    the Parrot turn around when it gets to the edge of the
    Stage.<\/p><\/div>\n"}],"ownerid":"4fc97d5d692f883a79004c38","details":"
    Watch the bird fly back and forth across the Stage.","concepts":"This
    project combines the forever loop, animation and motion to make the bird
    fly across the Stage. The animation is simulated by using Next
    Costume<\/em> in the forever loop. The Move 6 Steps<\/em> block moves
    the bird in the direction it is pointing. If on edge, bounce<\/em> is the block
    that detects that the bird hits the end of the Stage and turns it around.
    Used in combination, it appears that the bird is flying across the Stage. "}
```

Learning module engine 24, shown in FIG. 2, is invoked when a user runs a lesson module. For example, a user from a learning center client utilizes learning center workshop 21 through an interface to invoke the lesson module. For example, the interface is a web browser on a computing device such as a personal computer or a tablet. For example, when learning is launched, a user chooses to run the lesson module using a browser. Then, learning module engine 24 takes over and guides the user to complete the lesson within the lesson module.

For example, learning module engine 24 displays a lesson bar that shows the steps that the user must perform. The area of the screen that the user must work on is highlighted and in order to proceed, the user must complete a current task. For example, learning module engine 24 provides the user with real-time help such as a "Hint/Show Me" button. Learning module engine 24 also plays any voice over or video associated with the lesson module. Learning module engine 24 also, for example, provides a user with an option to fast forward several steps in a larger task and an option to step backwards.

For example, learning module engine 24, while the user adds logic, highlights the source and target areas of the task. If the user makes a mistake, learning module engine 24 takes the user back to a known state. Once the user has recreated the original program, the lesson is complete. The user can then use learning module generator 23 to modify the lesson module.

For example, learning module engine 24 can also operate in other modes. For example, learning module engine 24 can include a mode where a user can open a lesson module and learning module engine 24 will animate the lesson module to a certain step. Similarly, learning module engine 24 can include a mode where a lesson module is run in slow motion continuously with voiceover. This mode can be useful, for example, when a user wants to generate a video.

Figure 10:
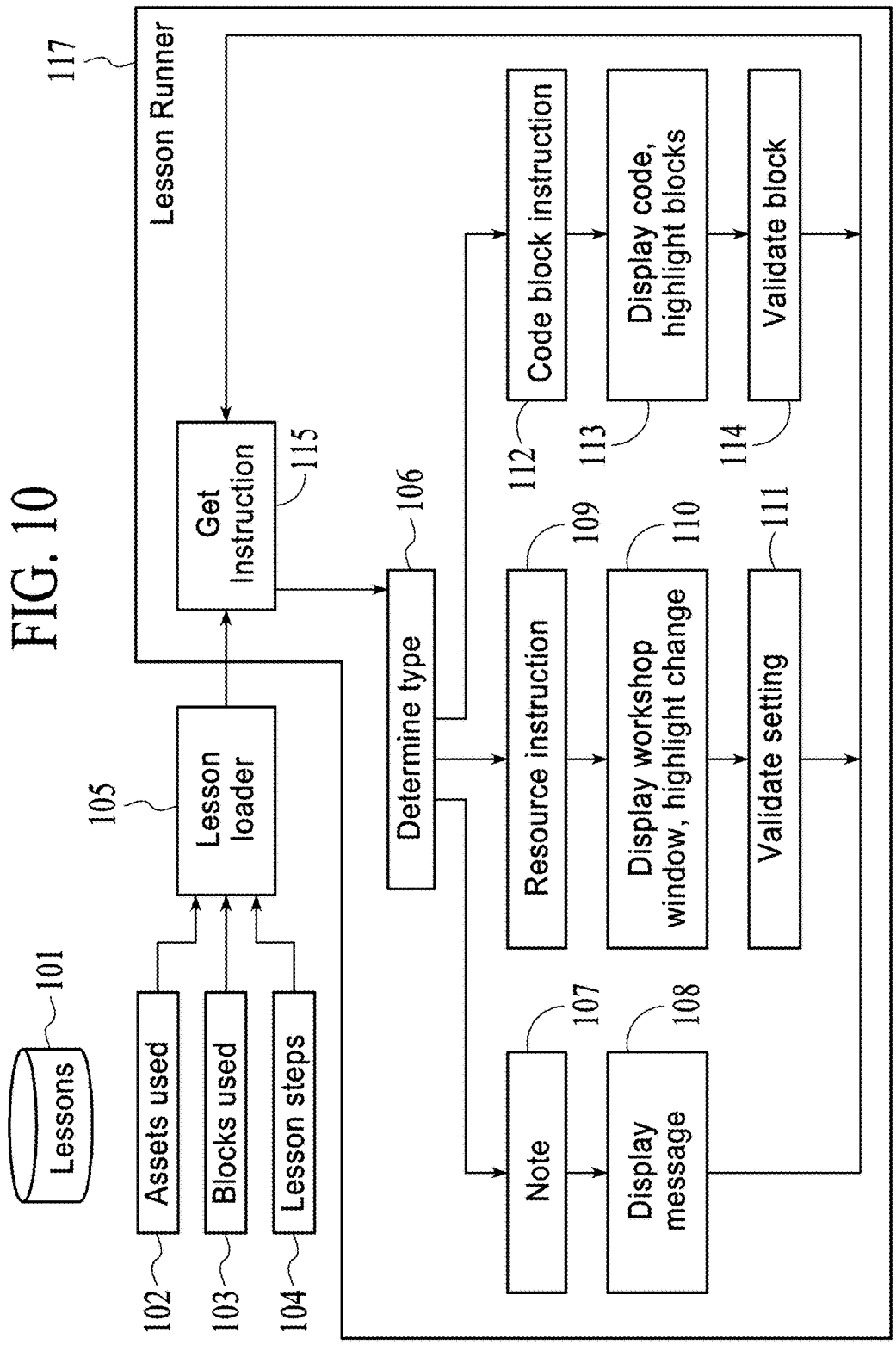
FIG. 10 is a simplified block diagram of a lesson runner architecture that runs lesson modules within a learning center runtime in accordance with an implementation.

FIG. 10 is a simplified block diagram illustrating operation of learning module engine 24. Lessons produced by learning module generator 23 are stored in lessons storage 101. A lesson loader 105 within learning module engine 24 sequentially loads assets, computer programming blocks and lesson steps respectively stored as assets used 102, blocks used 103 and lesson steps 104 within lessons storage 101. Lesson loader loads lesson data and adds to data structures the media assets from assets 102 that will be used. Media assets include, for example, images and sounds.

From within a lesson runner 117, a get instruction block 115 fetches an instruction within the instructions loaded by lesson loader 105. The instruction may include, for example, lessons steps from lesson steps 104, assets from assets 102 and blocks from blocks used 103. Get instruction 115 determines the type of instruction and passes it to the appropriate lesson step handler.

A determine type block 106 within learning module engine 24 sequentially handles instructions from lesson loader 105 and determines instruction type.

For a plain note, the message is displayed and/or spoken. This is an informational message requiring either a timeout or user acknowledgement to continue. This is represented in FIG. 10 where for a note 107, learning module engine 24 displays a message, as represented by a block 108.

When a resource instruction is run, the resources that are to be used when hints are turned on are highlighted. The lesson step instructions are displayed and/or spoken with entered explanations from the lesson creator. A check is performed that the resource was placed in the correct place by checking the associated project data structures for the correct placement. This is represented in FIG. 10 where for a resource instruction 109, learning module engine 24 displays a workshop window and highlights change, as represented by a block 110. Learning module engine 24 also validates settings, as represented by a block 111.

A code block instruction, when run, highlights the block to be used when hints are turned on and shows where the block should be placed on the code canvas. The lesson step instructions are displayed and/or spoken with entered explanations from the lesson creator. A check is made that the block was placed in the correct place by checking the associated project code data structures. If validation is not successful, a message appears offering some hints. For example, the hints might include such things as animating actions, highlighting location on the display or masking location on the display.

Users are optionally allowed to proceed to the next step, in which case the lesson runner performs the action on behalf of the user. If validation was successful, the next lesson step is executed. This is represented in FIG. 10 where for a code block instruction 112, learning module engine 24 displays code and highlight blocks, as represented by a block 113. Learning module engine 24 also validates programming blocks, as represented by a block 114.

After an instruction is processed, in a block 115, a next instruction is obtained. The lesson proceeds until no more steps, at which point the runner can offer additional activities or the user (lesson creator) can embed additional activities that can be done.

Figure 11:
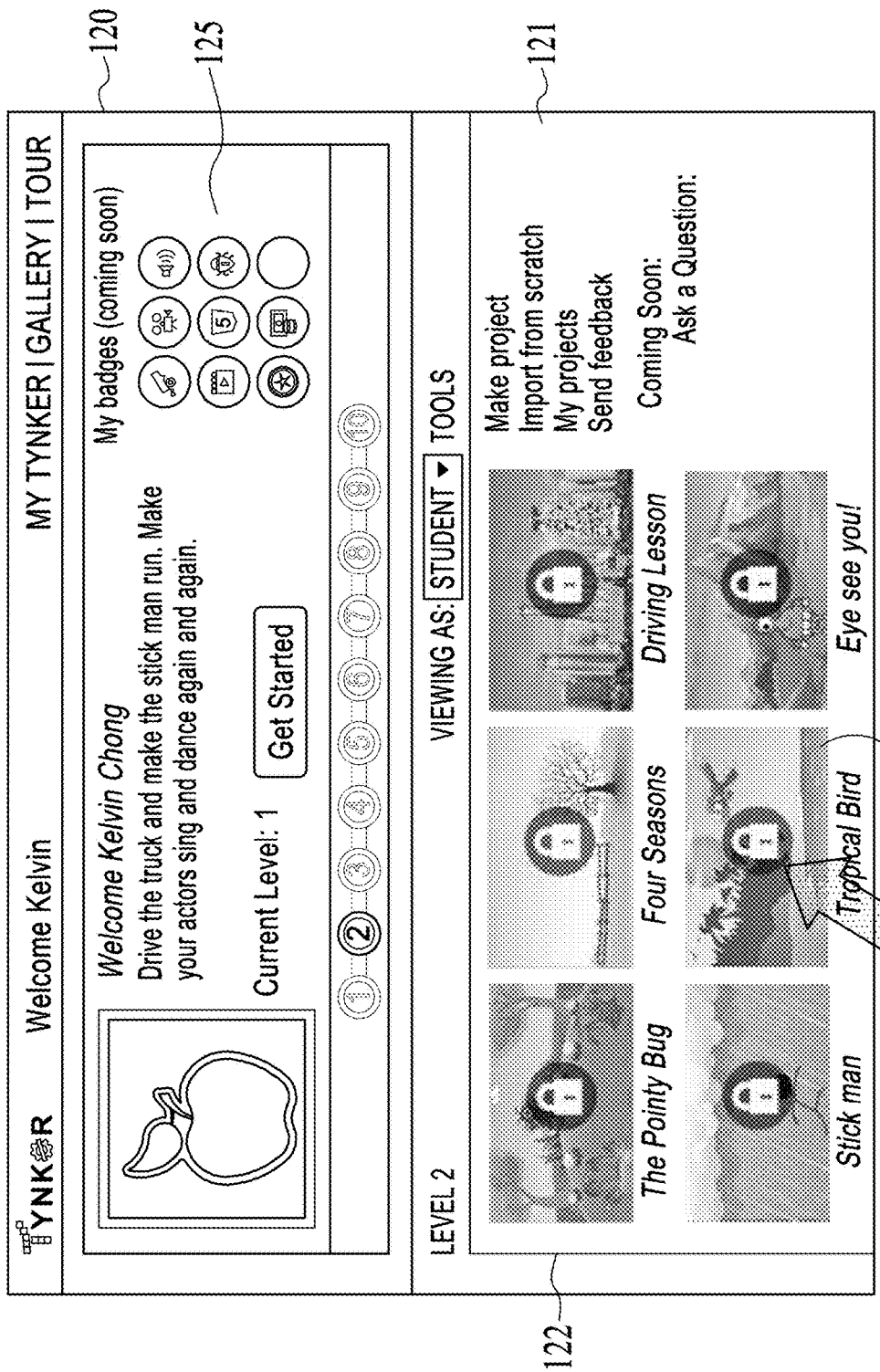

FIG. 11 shows a welcome window interface 120. An area 125 provides announcements to a user. An area 121 allows the user to select an action. An area 122 allows the user to select a project (computer program) to run. In FIG. 11, a cursor 123 illustrates the user selecting an icon 124 for the tropical bird lesson. Selection of icon 124 brings up an interface for the tropical bird and activates learning module engine 24 to run a project lesson for the tropical bird, as illustrated by FIG. 12.

Figure 12:
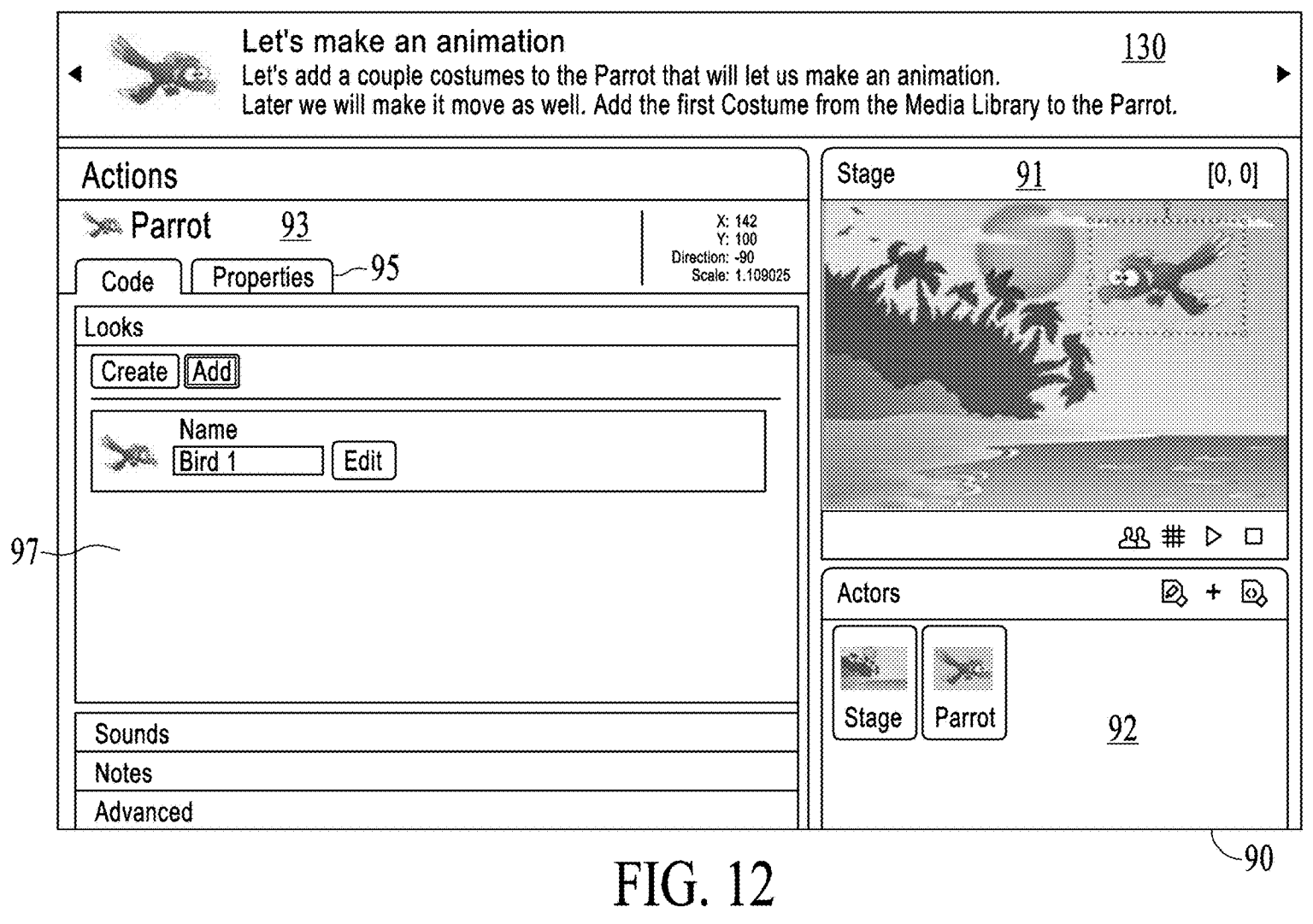
Figure 13:
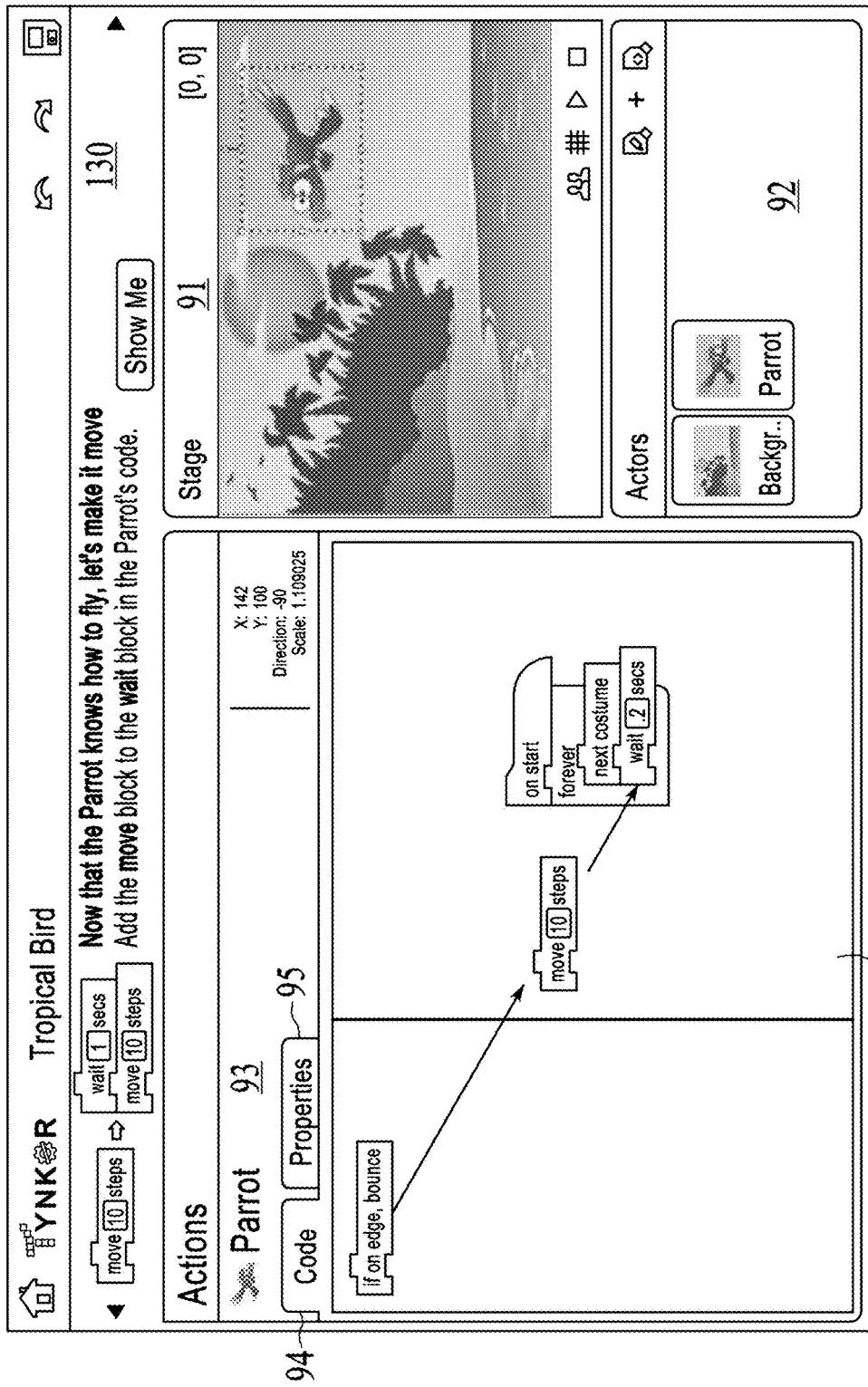

FIG. 12 shows user interface 90 with the added addition of a bar 130 through which learning module engine 24 communicates with the user. As illustrated by FIG. 13, learning module engine 24 communicates to the user next steps in the lesson and also can provide visual instruction by adjusting entities within work area 96 and code block area 97. For example, when a user selects the "Show Me" button within learning bar 130 as shown in FIG. 13, learning module engine 24 provides animation of the move block in code block area 97 being added to the wait block shown in work area 96.

For example, the Learning Center also allows the creation and running of puzzle type lessons with system validating success and failure type triggers.

That is, a puzzle is an example of a special kind of lesson that has bunt in validation. For example, the puzzle has a specific success criteria that the author defines, such as: "Make the robot go to the green square."

The author of a puzzle lesson module builds the project (computer program) using learning center workshop. When building the lesson modules, the author uses two special blocks of code: a success criteria block and a failure criteria block. The author uses the blocks to define success and failure and to indicate the consequences of success and failure. The author then uses learning module generator 23 to generate a lesson module for the project.

When a user opens the project in a lesson running mode, upon a user completing an action, learning module engine 24 will check whether the success or failure criteria are valid. Learning module engine 24 will then execute the consequences of success or failure, as appropriate. This is illustrated in FIG. 14.

Figure 14:
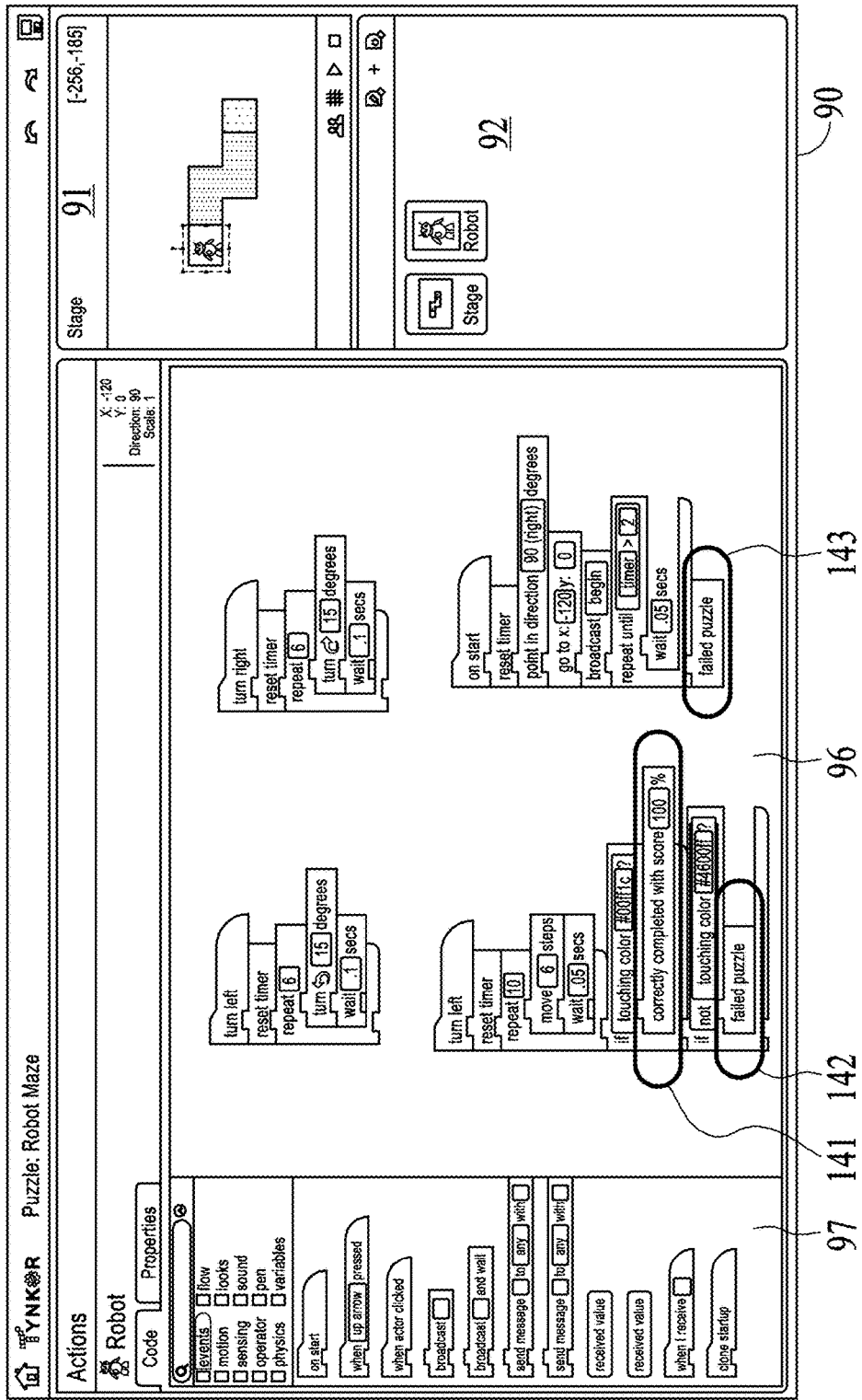
FIG. 14 shows a success criteria block and a failure criteria block as displayed by a graphics user interface used to create lesson modules within a learning center runtime in accordance with an implementation.

FIG. 14 shows how a lesson creator can define a success criteria block 141, a failure criteria block 142 and a failure criteria block 143 within work area 96 of interface 90 while creating a lesson or puzzle with using learning center workshop 21.

Figure 15:
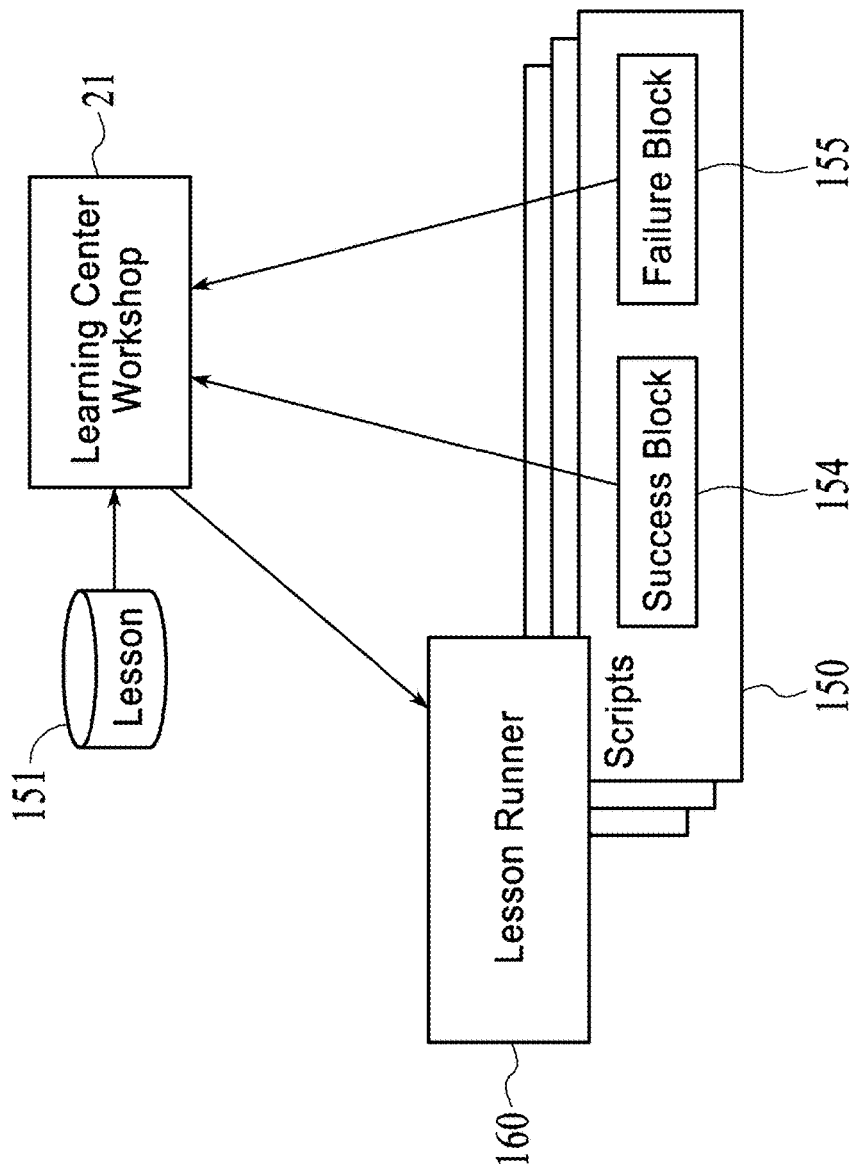
FIG. 15 and FIG. 16 are simplified block diagrams illustrating validation of a project within a learning center runtime in accordance with an implementation.

FIG. 15 is a block diagram that illustrates a lesson module 151 that includes scripts 150 that include a success block 154 and a failure block 155. These are utilized by learning center workshop 21 to construct a project to be run by a lesson runner 160 to run the lesson.

For example, the learning center allows a user to define activities that can be automatically validated by the learning runtime. For example, a task is presented to the student to accomplish a goal such as to write code to move a golf ball into a hole. The student creates the code. In order to check whether the code accomplishes the task, code blocks that the student has added can be checked to see that the code blocks are in the correct order. Alternatively, a trigger methodology can be used to determine whether the task was accomplished.

For example, a trigger is assigned to the objects that a user manipulates. The trigger is based on whether a criteria placed within the computing program has been satisfied. For example the objects are a ball and a hole. The triggers are hidden from the user. The triggers are code instructions that check for the criteria, as delineated by parameters. If the parameters are satisfied, the trigger is fired, and the process that checks that the code can determine whether the user accomplished the task. For example, a geometric criteria specifies that a ball must travel a certain distance. For example, a hole trigger checks that the ball is within the bounds of the hole.

In addition, other types of criteria can be used. For example, a time-based criteria indicates whether a task is completed within a specified amount of time. For example, did a mouse finish a maze in under 8 seconds? A code based criteria determines whether code used to accomplish a task is within predetermined parameters. For example, was a lesson completed using under 8 code blocks and without using recursion? Value-based criteria determine whether a particular value was reached. For example, was a score greater than 25? Event criteria determine whether a certain event criteria was received. For example, was a message sent by one of the actors? A physics based criteria indicates a physical property or phenomena occurred. For example, did a cannon ball reach a velocity of at least 25 meters per second? An external physical criteria indicates some real activity outside the program occur. For example, did a sensor on a physical stage robot move 10 feet?

Figure 16:
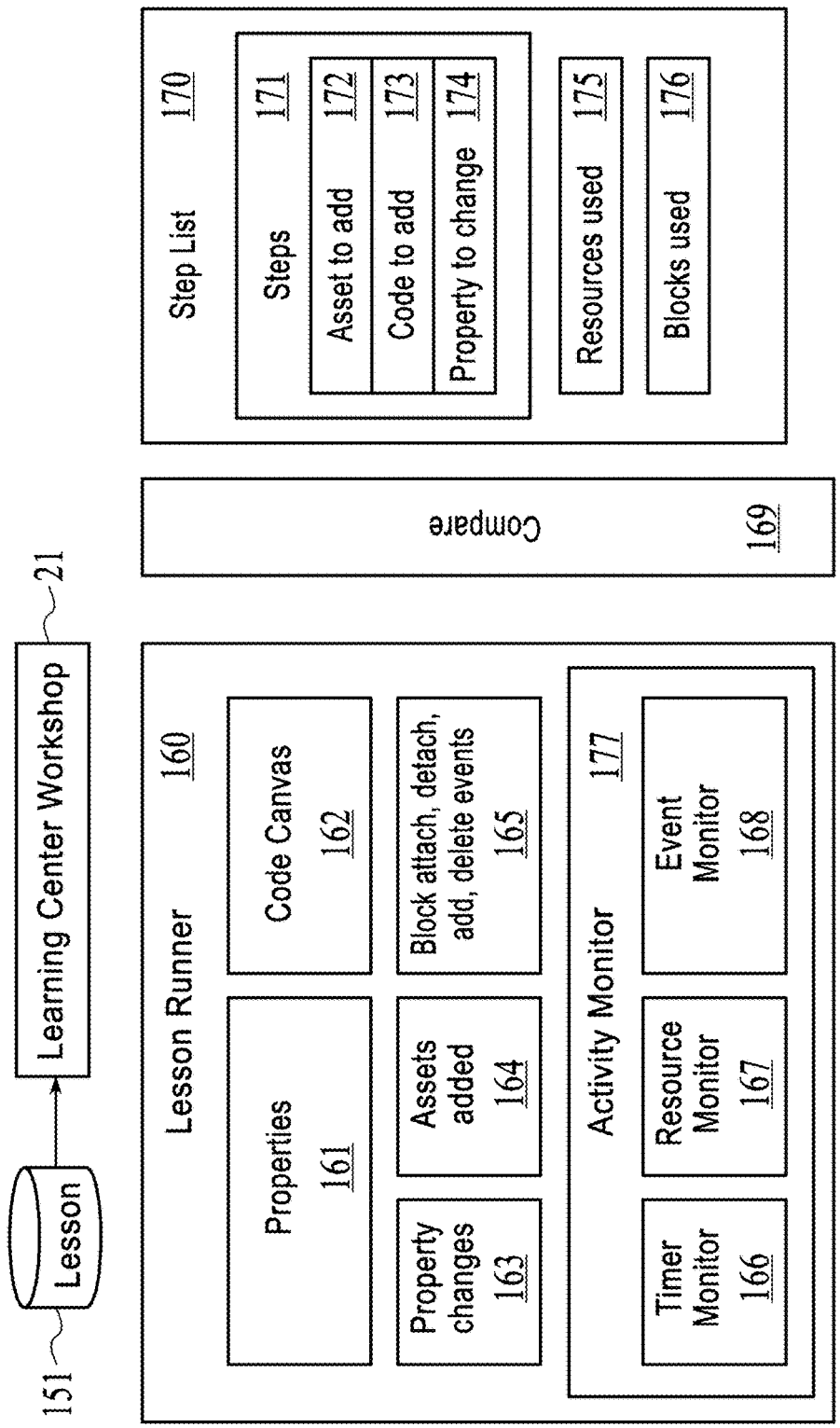

FIG. 16 illustrates validation during a lesson runtime. For example, lesson module 151 is run within learning center workshop 21 that calls lesson runner 160 to run the lesson module. Lesson runner 160 includes properties 161 and a code canvas 162. Actions on properties 161 or code canvas 162 triggers property changes 163, assets added events 164 and block events 165. Block events 165 include, for example, block attach events, block detach events, block add events and block delete events.

An activity monitor 177 within lesson runner 160 includes a timer module 166, a resource monitor 167 and an event monitor 168. Lesson runner 160 performs a compare function 169 with a step list 170. Step list 170 includes steps 171, resources used 175 and blocks used 176. Each of steps 171 may be an asset to add step 177, a code to add step 173 or a property to change step 174.

Figure 17:
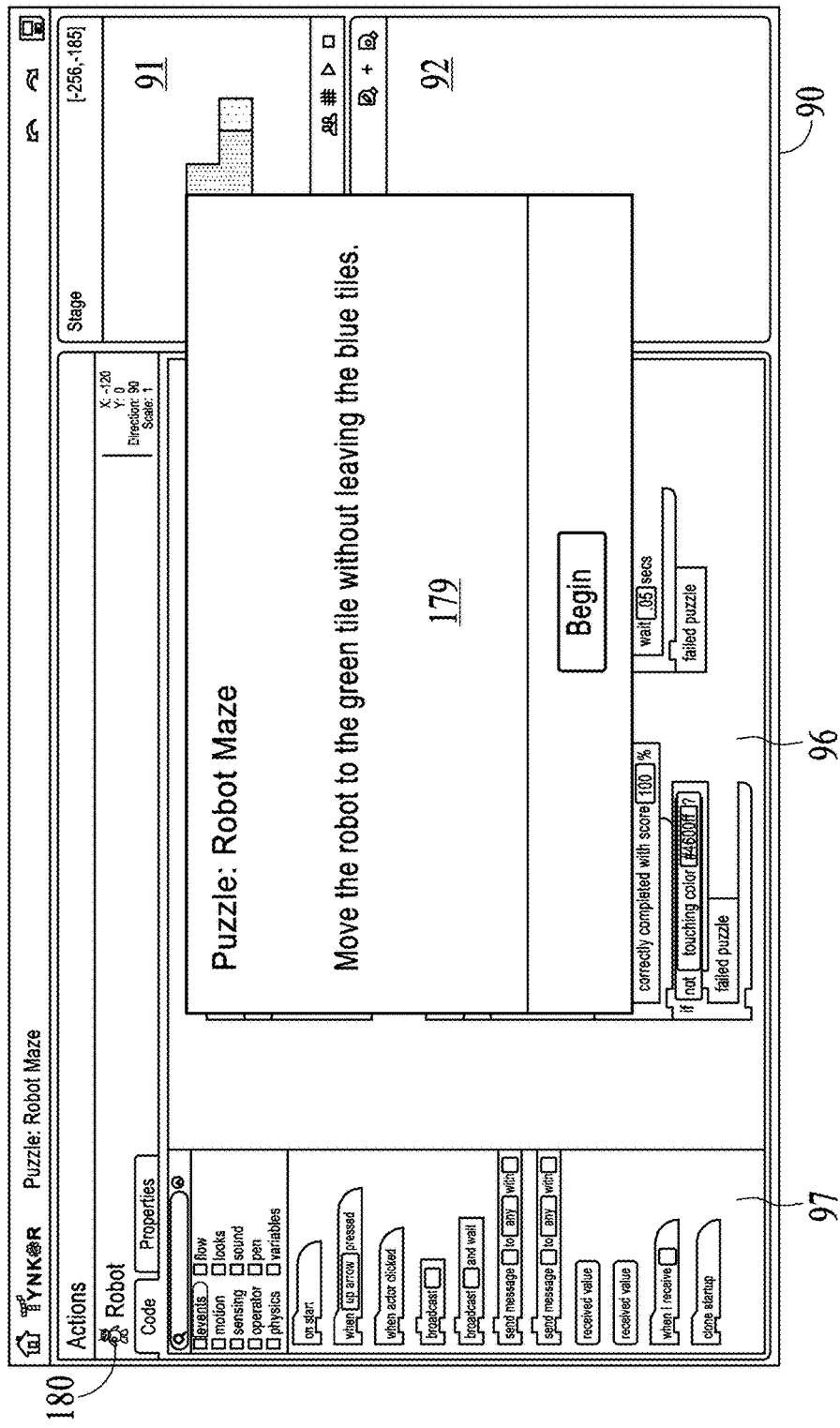
FIG. 17, FIG. 18 and FIG. 19 are simplified diagrams illustrating operation of a graphics user interface providing runtime feedback to a user within a lesson running in a puzzle mode within a learning center runtime in accordance with an implementation.

FIG. 17 gives an example of a window 179 that may appear over interface 90 that gives instructions for a lesson module that includes validation.

Figure 18:
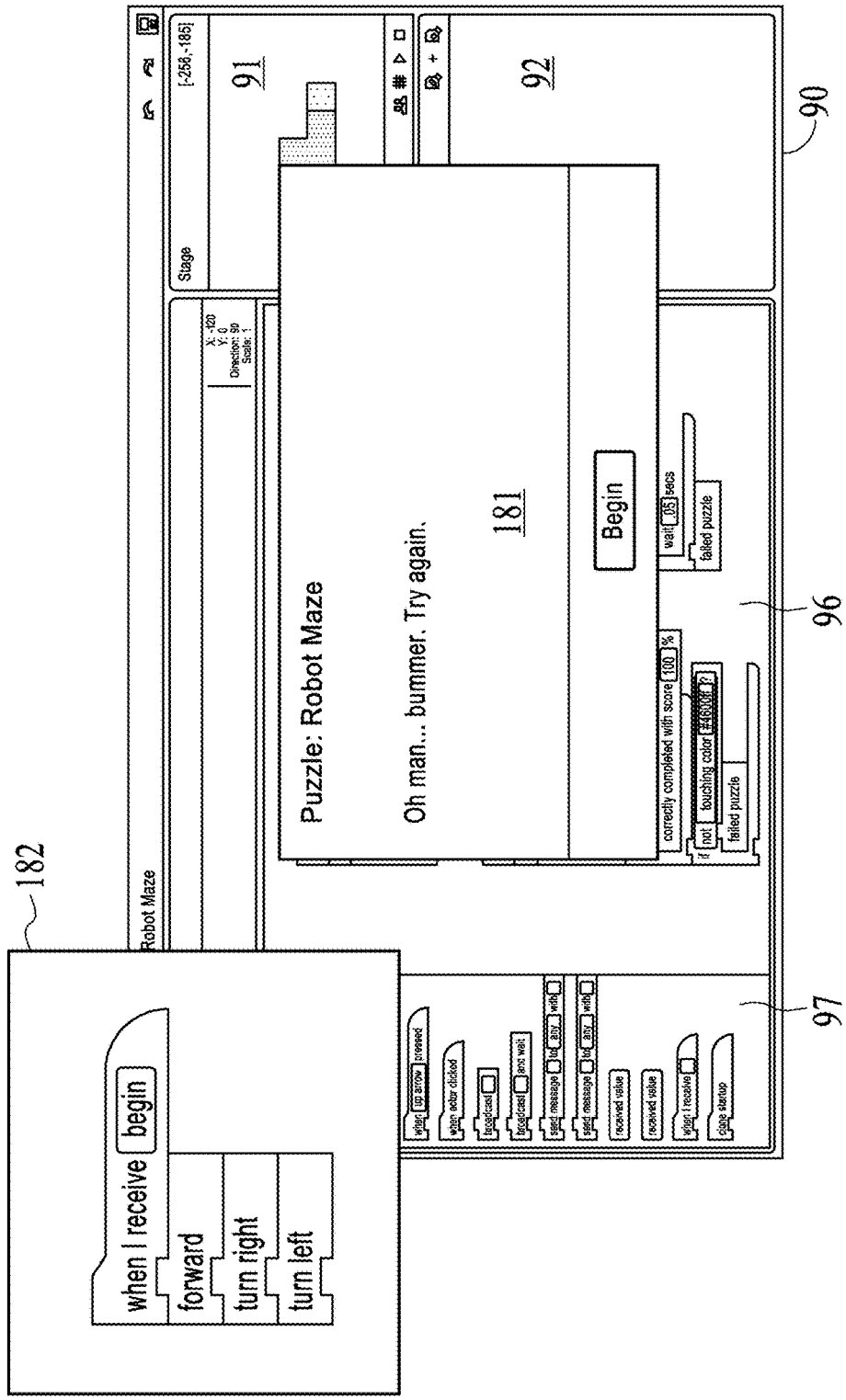

FIG. 18 gives an example of a window 181 that appears over interface 90 when a user fails to perform a lesson properly. Blow up section 182 of work area 96 shows the incorrect code blocks.

Figure 19:
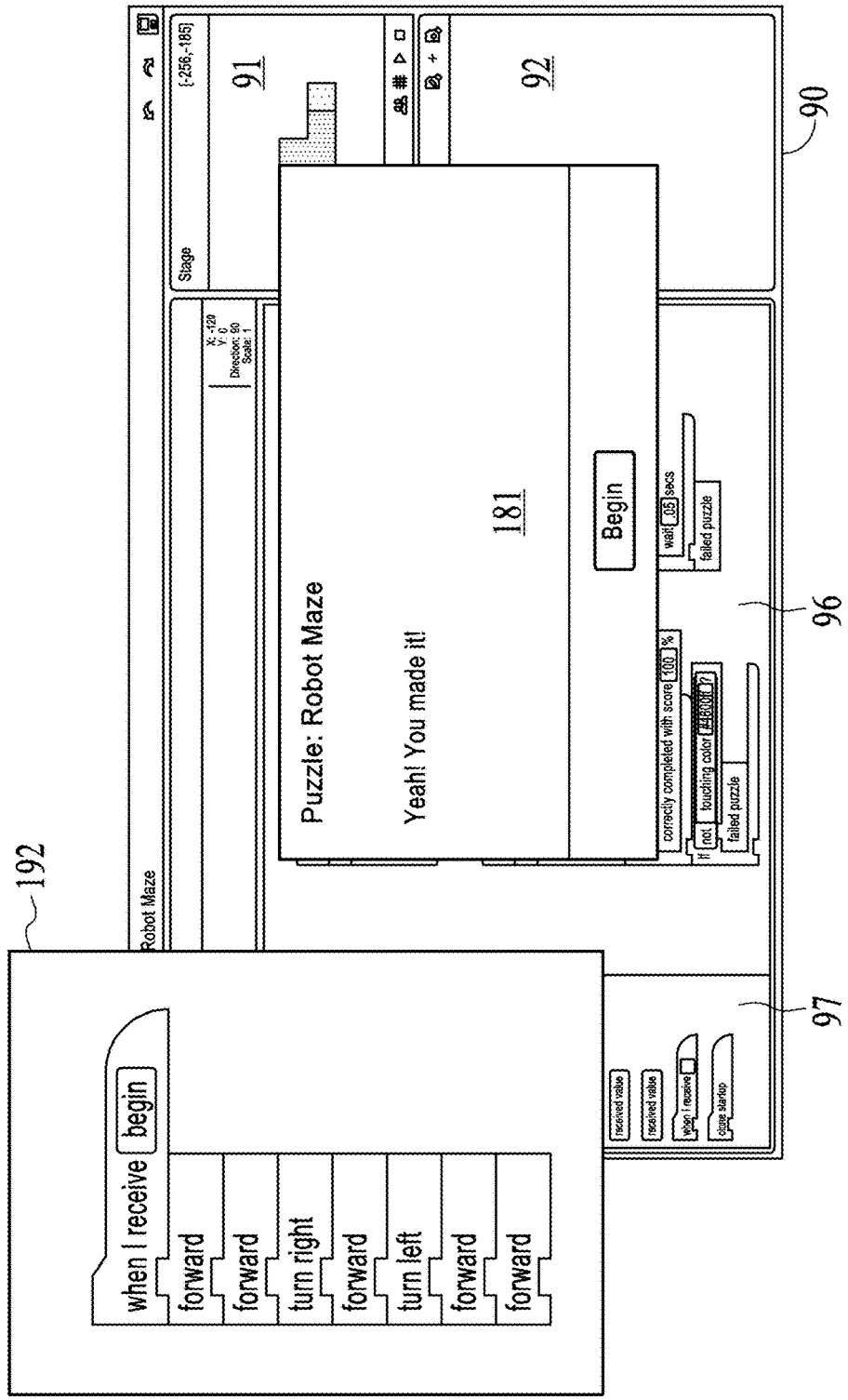

FIG. 19 gives an example of a window 191 that appears over interface 90 when user performs a lesson properly. Blow up section 192 of work area 96 shows the correct code blocks.

After a project author generates a lesson module within learning center server 12, the author can make the lesson module available to other users of learning center server 12. For example, other users are charged a fee for using a lesson module made available by an author and the author receives a portion of the fee, based, for example, on the number of other users that use the lesson module.

For example, an author is reimbursed based on tracking the number of times another user views or completes a lesson authored by the author. For example, an author gets paid $2 for every 1000 lesson views inside a paid course authored by the author. Alternatively, an author can sell a lesson for a flat fee.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A computer implemented method comprising:
   receiving, by a computer system coupled to the Internet, an access request transmitted over the Internet from a first client computing device of a first user;
   in response to the access request, causing, by the computer system, a plurality of programming blocks to be visually displayed as building blocks on a user interface of the first client computing device, the building blocks including a success criteria block and a failure criteria block;
   receiving, by the computer system over the Internet, a selection of programming blocks connected together by the first user via the user interface of the first computing device;
   generating, by the computer system, a computer program based on the programming blocks being connected together, wherein the computer program comprises an object list and a plurality of scripts, and the plurality of scripts comprises the success criteria block and the failure criteria block;
   executing, by the computer system, the computer program, the executing comprising running a first script of the plurality of scripts in response to an external trigger event, wherein the first script is fetched from a list of running scripts in a scheduler;
   in response to an end of the first script being reached, removing, by the computer system, the first script from the list of running scripts;
   generating, by the computer system and based on the computer program, an ordered list of steps for a learning module, wherein generating the ordered list of steps for the learning module includes discovering dependencies within the computer program, and ordering the list of steps based on the dependencies;
   in response to input from the first user via the user interface, adding a notation to the ordered list of steps and reordering steps in the ordered list of steps;
   transmitting the learning module, by the computer system over the Internet, to a second client computing device of a second user; and
   causing, by the computer system, the learning module to run on the second client computing device to guide the second user in re-creating the computer program.

2. The method of claim 1, wherein generating the ordered list of steps for the learning module additionally includes:
   giving steps that include definitions that are used in steps having cyclical dependencies priority to be placed earlier in the ordered list of steps.

3. The method of claim 1, wherein generating the ordered list of steps for the learning module includes:
   analyzing objects used by the computer program to determine sounds.

4. The method of claim 1, additionally comprising:
   receiving voice input from the first user via the user interface; and
   adding the voice input as a notation to one or more of the ordered list of steps, whereby the voice notation is played while the learning module is run.

5. The method of claim 1, wherein the success criteria block is associated with a criteria selected from the group consisting of:
   a geometric criteria;
   a time-based criteria;
   a code based criteria;
   a value-based criteria;
   a physics based criteria;
   an external physical criteria; and
   combinations thereof.

6. The method of claim 1, wherein running the learning module on the second client computing device includes:
   displaying the ordered list of steps to the second user;
   monitoring actions of the second user to determine if correct actions are taken; and
   providing a hint to the second user in response to determining, based on monitoring the actions of the second user, that the second user has failed to complete the learning module.

7. The method of claim 6, wherein the hint is selected from the group consisting of:
   animating an action;
   highlighting a location on a display;
   masking a location on the display; and
   combinations thereof.

8. A tangible, non-transitory computer-readable medium storing instructions that, when executed by a computer system coupled to the Internet, cause the computer system to:
   receive an access request transmitted over the Internet from a first client computing device of a first user;
   in response to the access request, cause a plurality of programming blocks to be visually displayed as building blocks on a user interface of the first client computing device, the building blocks including a success criteria block and a failure criteria block;
   receive, over the Internet, a selection of programming blocks connected together by the first user via the user interface of the first computing device;
   generate a computer program based on the programming blocks being connected together, wherein the computer program comprises an object list and a plurality of scripts, and the plurality of scripts comprises the success criteria block and the failure criteria block;

execute the computer program, the executing comprising running a first script of the plurality of scripts in response to an external trigger event, wherein the first script is fetched from a list of running scripts in a scheduler;

in response to an end of the first script being reached, remove the first script from the list of running scripts;

generate, based on the computer program, an ordered list of steps for a learning module, wherein generating the ordered list of steps for the learning module includes discovering dependencies within the computer program, and ordering the list of steps based on the dependencies;

in response to input from the first user via the user interface, add a notation to the ordered list of steps and reorder steps in the ordered list of steps;

transmit the learning module, over the Internet, to a second client computing device of a second user; and cause the learning module to run on the second client computing device to guide the second user in re-creating the computer program.

9. A system coupled to the Internet comprising:

a processor; and memory coupled to the processor and storing instructions that, when executed by the processor, cause the system to:

receive an access request transmitted over the Internet from a first client computing device of a first user;

in response to the access request, cause a plurality of programming blocks to be visually displayed as building blocks on a user interface of the first client computing device, the building blocks including a success criteria block and a failure criteria block;

receive, over the Internet, a selection of programming blocks connected together by the first user via the user interface of the first computing device;

generate a computer program based on the programming blocks being connected together, wherein the computer program comprises an object list and a plurality of scripts, and the plurality of scripts comprises the success criteria block and the failure criteria block;

execute the computer program, the executing comprising running a first script of the plurality of scripts in response to an external trigger event, wherein the first script is fetched from a list of running scripts in a scheduler;

in response to an end of the first script being reached, remove the first script from the list of running scripts;

generate, based on the computer program, an ordered list of steps for a learning module, wherein generating the ordered list of steps for the learning module includes discovering dependencies within the computer program, and ordering the list of steps based on the dependencies;

in response to input from the first user via the user interface, add a notation to the ordered list of steps and reorder steps in the ordered list of steps;

transmit the learning module to a second client computing device of a second user; and cause the learning module to run on the second client computing device to guide the second user in re-creating the computer program.

* * * * *